US012670279B2

(12) United States Patent
Morita et al.

(10) Patent No.: US 12,670,279 B2
(45) Date of Patent: Jun. 30, 2026

(54) DATABASE MANAGEMENT SYSTEM USING POLICY LABELS, ROLE PATTERNS, ROLES, AND ACCESS CONTROL RELATING THERETO IN METADATA OF A TARGET TABLE

(71) Applicant: Fujitsu Limited, Kawasaki (JP)

(72) Inventors: Chihiro Morita, Osaka (JP); Naoki Umeda, Akashi (JP); Takuma Maeda, Kobe (JP); Yuho Shiinoki, Akashi (JP); Nobuyuki Washio, Akashi (JP); Kosuke Suzuki, Ota (JP)

(73) Assignee: Fujitsu Limited, Kawasaki (JP)

( * ) Notice: Subject to any disclaimer, the term of this patent is extended or adjusted under 35 U.S.C. 154(b) by 259 days.

(21) Appl. No.: 18/239,958

(22) Filed: Aug. 30, 2023

(65) Prior Publication Data

US 2024/0184907 A1 Jun. 6, 2024

(30) Foreign Application Priority Data

Dec. 6, 2022 (JP) ................................. 2022-195232

(51) Int. Cl.
*G06F 21/62* (2013.01)
*G06F 16/90* (2019.01)
(Continued)

(52) U.S. Cl.
CPC ........ *G06F 21/6218* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 7,971,231 B2 * | 6/2011 | Gupta | ................. H04L 41/0866 726/4 |
| 10,650,003 B1 * | 5/2020 | Rubin | ............... G06F 16/24573 |

(Continued)

FOREIGN PATENT DOCUMENTS

JP 2009-301357 A 12/2009

OTHER PUBLICATIONS

A methodology for integrating access control policies within database development. Abramov. Elsevier. (Year: 2012).*

(Continued)

*Primary Examiner* — Venkat Perungavoor
(74) *Attorney, Agent, or Firm* — WHDA, LLP

(57) ABSTRACT

A recording medium storing a program and method causing a computer to: store a first policy label according to a data type to be stored in a target table in metadata of the target table; refer to policy management information that defines content of access control that is performed on each role pattern and specifying the content of the access control that is performed on the each role pattern that corresponds to the first policy label stored in the metadata, for each of policy label that includes the first policy label; and refer to role management information that represents a correspondence between the each role pattern and roles in the target table and create access control information that represents content of access control that is performed on a role based on the specified content of the access control that is performed on the each role pattern.

10 Claims, 18 Drawing Sheets

(51) Int. Cl.
 *H04L 9/40* (2022.01)
 *G06F 16/13* (2019.01)

(56) References Cited

U.S. PATENT DOCUMENTS

| | | | | |
|---|---|---|---|---|
| 11,063,930 | B1 * | 7/2021 | Bose ................... | H04L 63/0428 |
| 11,593,514 | B2 * | 2/2023 | Shah ....................... | G06F 21/57 |
| 2002/0077803 | A1 * | 6/2002 | Kudoh ................ | G06F 21/6218 |
| | | | | 704/1 |
| 2022/0237320 | A1 * | 7/2022 | Nakagawa .............. | H04L 63/10 |
| 2022/0286484 | A1 * | 9/2022 | Hale ..................... | H04L 63/105 |
| 2023/0259643 | A1 * | 8/2023 | Szigeti ................ | G06F 21/6218 |
| | | | | 726/28 |
| 2024/0078333 | A1 * | 3/2024 | Lim .................... | G06F 21/6227 |
| 2025/0028850 | A1 * | 1/2025 | Trachy ............... | H04L 67/1097 |

OTHER PUBLICATIONS

Role of Bloom Filter in Big Data Research: A Survey. Patgiri et al. IJACSA. (Year: 2018).*
Role-Based Access Control for Grid Database Services Using the Community Authorization Service. Pereira et al. IEEE. (Year: 2006).*

* cited by examiner

Figure 4:
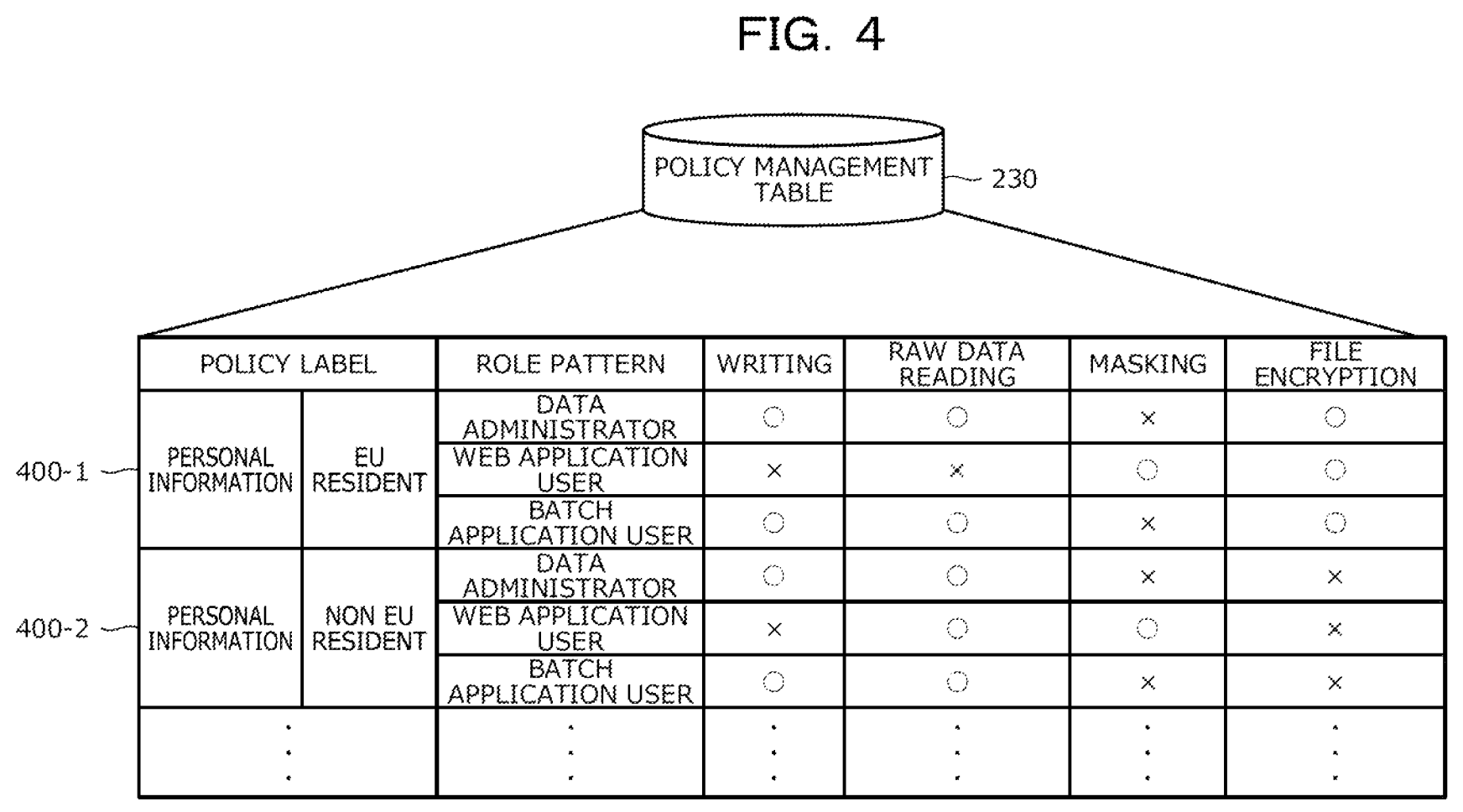

POLICY MANAGEMENT TABLE 230

| POLICY LABEL | ROLE PATTERN | WRITING | RAW DATA READING | MASKING | FILE ENCRYPTION |
|---|---|---|---|---|---|
| PERSONAL INFORMATION EU RESIDENT | DATA ADMINISTRATOR | ○ | ○ | × | ○ |
| | WEB APPLICATION USER | × | × | ○ | ○ |
| | BATCH APPLICATION USER | ○ | ○ | × | ○ |
| PERSONAL INFORMATION NON EU RESIDENT | DATA ADMINISTRATOR | ○ | ○ | × | × |
| | WEB APPLICATION USER | × | ○ | ○ | × |
| | BATCH APPLICATION USER | ○ | ○ | × | × |
| . . . | . . . | . . . | . . . | . . . | . . . |

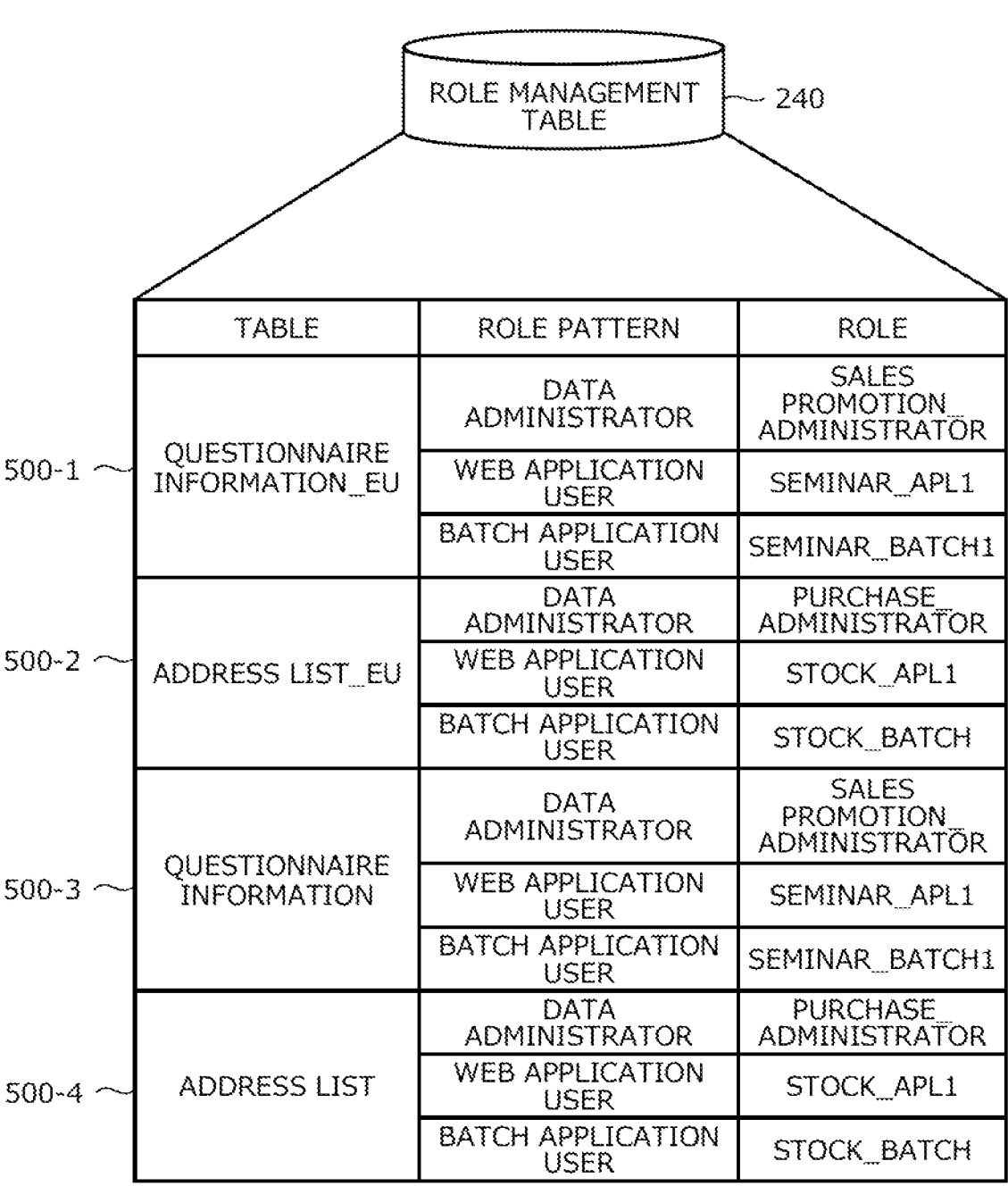

| | TABLE | ROLE PATTERN | ROLE |
|---|---|---|---|
| 500-1 | QUESTIONNAIRE INFORMATION_EU | DATA ADMINISTRATOR | SALES PROMOTION_ ADMINISTRATOR |
| | | WEB APPLICATION USER | SEMINAR_APL1 |
| | | BATCH APPLICATION USER | SEMINAR_BATCH1 |
| 500-2 | ADDRESS LIST_EU | DATA ADMINISTRATOR | PURCHASE_ ADMINISTRATOR |
| | | WEB APPLICATION USER | STOCK_APL1 |
| | | BATCH APPLICATION USER | STOCK_BATCH |
| 500-3 | QUESTIONNAIRE INFORMATION | DATA ADMINISTRATOR | SALES PROMOTION_ ADMINISTRATOR |
| | | WEB APPLICATION USER | SEMINAR_APL1 |
| | | BATCH APPLICATION USER | SEMINAR_BATCH1 |
| 500-4 | ADDRESS LIST | DATA ADMINISTRATOR | PURCHASE_ ADMINISTRATOR |
| | | WEB APPLICATION USER | STOCK_APL1 |
| | | BATCH APPLICATION USER | STOCK_BATCH |

ROLE MANAGEMENT TABLE ~ 240

| oid | tablename | tablenamespace | tableowner |
|-----|-----------|----------------|------------|
| 16393 | QUESTIONNAIRE INFORMATION | 99 | 10 |
| ⋮ | ⋮ | ⋮ | ⋮ |

800-1

800

| oid | tablename | tablenamespace | tableowner | policylabel |
|-----|-----------|----------------|------------|-------------|
| 16393 | QUESTIONNAIRE INFORMATION | 99 | 10 | EU RESIDENT_PERSONAL INFORMATION |
| ⋮ | ⋮ | ⋮ | ⋮ | ⋮ |

ACCESS CONTROL TABLE — 1100

| TABLE | POLICY LABEL | ROLE PATTERN | ROLE | WRITING | RAW DATA READING | MASKING | FILE ENCRYPTION |
|---|---|---|---|---|---|---|---|
| QUESTIONNAIRE INFORMATION_EU (1100-1) | PERSONAL INFORMATION / EU RESIDENT | DATA ADMINISTRATOR | SALES PROMOTION_ADMINISTRATOR | ○ | ○ | × | ○ |
| | | WEB APPLICATION USER | SEMINAR_APL1 | × | × | ○ | ○ |
| | | BATCH APPLICATION USER | SEMINAR_BATCH1 | ○ | ○ | × | ○ |
| ADDRESS LIST_EU (1100-2) | PERSONAL INFORMATION / EU RESIDENT | DATA ADMINISTRATOR | PURCHASE_ADMINISTRATOR | ○ | ○ | × | ○ |
| | | WEB APPLICATION USER | STOCK_APL1 | × | × | ○ | ○ |
| | | BATCH APPLICATION USER | STOCK_BATCH1 | ○ | ○ | × | ○ |
| ACCOUNT INFORMATION_EU (1100-3) | PERSONAL INFORMATION / EU RESIDENT | DATA ADMINISTRATOR | PURCHASE_ADMINISTRATOR | ○ | ○ | × | ○ |
| | | BATCH APPLICATION USER | STOCK_BATCH2 | ○ | ○ | × | ○ |
| QUESTIONNAIRE INFORMATION (1100-4) | PERSONAL INFORMATION / NON EU RESIDENT | DATA ADMINISTRATOR | SALES PROMOTION_ADMINISTRATOR | ○ | ○ | × | × |
| | | WEB APPLICATION USER | SEMINAR_APL1 | × | ○ | ○ | × |
| | | BATCH APPLICATION USER | SEMINAR_BATCH1 | ○ | ○ | × | × |
| ADDRESS LIST (1100-5) | PERSONAL INFORMATION / NON EU RESIDENT | DATA ADMINISTRATOR | PURCHASE_ADMINISTRATOR | ○ | ○ | × | × |
| | | WEB APPLICATION USER | STOCK_APL1 | × | ○ | ○ | × |
| | | BATCH APPLICATION USER | STOCK_BATCH1 | ○ | ○ | × | × |

FIG. 13

ACCESS CONTROL EXECUTION TABLE (UPDATED) — 1200

| TABLE | POLICY LABEL | ROLE PATTERN | ROLE | WRITING | RAW DATA READING | MASKING | FILE ENCRYPTION |
|---|---|---|---|---|---|---|---|
| QUESTIONNAIRE INFORMATION_EU | PERSONAL INFORMATION EU RESIDENT | DATA ADMINISTRATOR | SALES PROMOTION_ADMINISTRATOR | ○ | ○ | × | ○ |
| | | WEB APPLICATION USER | SEMINAR_APL1 | × | × | ○ | ○ |
| | | BATCH APPLICATION USER | SEMINAR_BATCH1 | ○ | ○ | × | ○ |
| ADDRESS LIST_EU | PERSONAL INFORMATION EU RESIDENT | DATA ADMINISTRATOR | PURCHASE_ADMINISTRATOR | ○ | ○ | × | ○ |
| | | WEB APPLICATION USER | STOCK_APL1 | × | × | ○ | ○ |
| | | BATCH APPLICATION USER | STOCK_BATCH1 | ○ | ○ | × | ○ |
| ACCOUNT INFORMATION_EU | PERSONAL INFORMATION EU RESIDENT | DATA ADMINISTRATOR | PURCHASE_ADMINISTRATOR | ○ | ○ | × | ○ |
| | | BATCH APPLICATION USER | STOCK_BATCH2 | × | ○ | × | × |
| QUESTIONNAIRE INFORMATION | PERSONAL INFORMATION NON EU RESIDENT | DATA ADMINISTRATOR | SALES PROMOTION_ADMINISTRATOR | ○ | ○ | × | × |
| | | WEB APPLICATION USER | SEMINAR_APL1 | × | ○ | ○ | × |
| | | BATCH APPLICATION USER | SEMINAR_BATCH1 | ○ | ○ | × | × |
| ADDRESS LIST | PERSONAL INFORMATION NON EU RESIDENT | DATA ADMINISTRATOR | PURCHASE_ADMINISTRATOR | ○ | ○ | × | × |
| | | WEB APPLICATION USER | STOCK_APL1 | × | ○ | ○ | × |
| | | BATCH APPLICATION USER | STOCK_BATCH1 | ○ | ○ | × | × |

| TABLE | DATA TYPE | | ROLE PATTERN | ROLE | WRITING | RAW DATA READING | MASKING | FILE ENCRYPTION | AUDIT RESULT |
|---|---|---|---|---|---|---|---|---|---|
| QUESTIONNAIRE INFORMATION_EU | PERSONAL INFORMATION | EU RESIDENT | DATA ADMINISTRATOR | SALES PROMOTION_ADMINISTRATOR | NONE | NONE | NONE | NONE | OK |
| | | | WEB APPLICATION USER | SEMINAR_APL1 | NONE | NONE | NONE | NONE | OK |
| | | | BATCH APPLICATION USER | SEMINAR_BATCH1 | NONE | NONE | NONE | NONE | OK |
| ADDRESS LIST_EU | PERSONAL INFORMATION | EU RESIDENT | DATA ADMINISTRATOR | PURCHASE_ADMINISTRATOR | NONE | NONE | NONE | NONE | OK |
| | | | WEB APPLICATION USER | STOCK_APL1 | NONE | NONE | NONE | NONE | OK |
| | | | BATCH APPLICATION USER | STOCK_BATCH1 | NONE | NONE | NONE | NONE | OK |
| ACCOUNT INFORMATION_EU | PERSONAL INFORMATION | EU RESIDENT | DATA ADMINISTRATOR | PURCHASE_ADMINISTRATOR | NONE | NONE | NONE | NONE | OK |
| | | | BATCH APPLICATION USER | STOCK_BATCH2 | YES | NONE | NONE | NONE | NG |
| QUESTIONNAIRE INFORMATION | PERSONAL INFORMATION | NON EU RESIDENT | DATA ADMINISTRATOR | SALES PROMOTION_ADMINISTRATOR | NONE | NONE | NONE | NONE | OK |
| | | | WEB APPLICATION USER | SEMINAR_APL1 | NONE | NONE | NONE | NONE | OK |
| | | | BATCH APPLICATION USER | SEMINAR_BATCH1 | NONE | NONE | NONE | NONE | OK |
| ADDRESS LIST | PERSONAL INFORMATION | NON EU RESIDENT | DATA ADMINISTRATOR | PURCHASE_ADMINISTRATOR | NONE | NONE | NONE | NONE | OK |
| | | | WEB APPLICATION USER | STOCK_APL1 | NONE | NONE | NONE | NONE | OK |
| | | | BATCH APPLICATION USER | STOCK_BATCH1 | NONE | NONE | NONE | NONE | OK |

| TABLE | DATA TYPE | | ROLE PATTERN | ROLE | WRITING | RAW DATA READING | MASKING | FILE ENCRYPTION | AUDIT RESULT |
|---|---|---|---|---|---|---|---|---|---|
| 1501 QUESTIONNAIRE INFORMATION_EU | PERSONAL INFORMATION | EU RESIDENT | DATA ADMINISTRATOR | SALES PROMOTION_ADMINISTRATOR | NONE | NONE | NONE | NONE | OK |
| | | | WEB APPLICATION USER | SEMINAR_APL1 | YES | NONE | NONE | NONE | NG |
| | | | BATCH APPLICATION USER | SEMINAR_BATCH1 | NONE | NONE | NONE | NONE | OK |
| 1502 ADDRESS LIST_EU | PERSONAL INFORMATION | EU RESIDENT | DATA ADMINISTRATOR | PURCHASE_ADMINISTRATOR | NONE | NONE | NONE | NONE | OK |
| | | | WEB APPLICATION USER | STOCK_APL1 | NONE | NONE | NONE | NONE | OK |
| | | | BATCH APPLICATION USER | STOCK_BATCH1 | NONE | NONE | NONE | NONE | OK |
| 1503 ACCOUNT INFORMATION_EU | PERSONAL INFORMATION | EU RESIDENT | DATA ADMINISTRATOR | PURCHASE_ADMINISTRATOR | NONE | NONE | NONE | NONE | OK |
| | | | BATCH APPLICATION USER | STOCK_BATCH2 | NONE | NONE | NONE | NONE | OK |
| 1504 QUESTIONNAIRE INFORMATION | PERSONAL INFORMATION | NON EU RESIDENT | DATA ADMINISTRATOR | SALES PROMOTION_ADMINISTRATOR | NONE | NONE | NONE | NONE | OK |
| | | | WEB APPLICATION USER | SEMINAR_APL1 | NONE | NONE | NONE | NONE | OK |
| | | | BATCH APPLICATION USER | SEMINAR_BATCH1 | NONE | NONE | NONE | NONE | OK |
| 1505 ADDRESS LIST | PERSONAL INFORMATION | NON EU RESIDENT | DATA ADMINISTRATOR | PURCHASE_ADMINISTRATOR | NONE | NONE | NONE | NONE | OK |
| | | | WEB APPLICATION USER | STOCK_APL1 | NONE | NONE | NONE | NONE | OK |
| | | | BATCH APPLICATION USER | STOCK_BATCH1 | NONE | NONE | NONE | NONE | OK |

DATABASE MANAGEMENT SYSTEM USING POLICY LABELS, ROLE PATTERNS, ROLES, AND ACCESS CONTROL RELATING THERETO IN METADATA OF A TARGET TABLE

CROSS-REFERENCE TO RELATED APPLICATION

This application is based upon and claims the benefit of priority of the prior Japanese Patent Application No. 2022-195232, filed on Dec. 6, 2022, the entire contents of which are incorporated herein by reference.

FIELD

The embodiment discussed herein is related to a database management program, a database management method, and an information processing device.

BACKGROUND

In recent years, to acquire security certification is requirement as a system, and there is a case where middleware or services to be introduced are required to conform to standard rules of the security certification. It is not sufficient to acquire the security certification once, and there is a case where periodical update is needed.

Japanese Laid-open Patent Publication No. 2009-301357 is disclosed as related art.

SUMMARY

According to an aspect of the embodiments, a non-transitory computer-readable recording medium stores a database management program for causing a computer to execute processing including: storing a first policy label according to a data type to be stored in a target table that is an access control target in a database, in metadata of the target table; referring to policy management information that defines content of access control that should be performed on each role pattern and specifying the content of the access control that should be performed on the each role pattern that corresponds to the first policy label stored in the metadata, for each of a plurality of policy labels that includes the first policy label; and referring to role management information that represents a correspondence between the each role pattern and one or more roles in the target table and creating access control information that represents content of access control that should be performed on a role, for each of the role in the target table, based on the specified content of the access control that should be performed on the each role pattern.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram illustrating an example of a database management method according to an embodiment;

FIG. 3 is a block diagram illustrating a hardware configuration example of a database management device 201;

FIG. 4 is an explanatory diagram illustrating an example of storage content of a policy management table 230;

FIG. 5 is an explanatory diagram illustrating an example of storage content of a role management table 240;

FIG. 8 is an explanatory diagram illustrating an example of storage of a first policy label;

FIG. 11 is an explanatory diagram illustrating an example of storage content of an access control table 1100;

FIG. 13 is an explanatory diagram illustrating an example of storage content of the access control execution table 1200 (updated);

FIG. 14 is an explanatory diagram (part 1) illustrating a specific example of a difference detection result;

FIG. 15 is an explanatory diagram (part 2) illustrating a specific example of the difference detection result;

DESCRIPTION OF EMBODIMENTS

Figure 2:
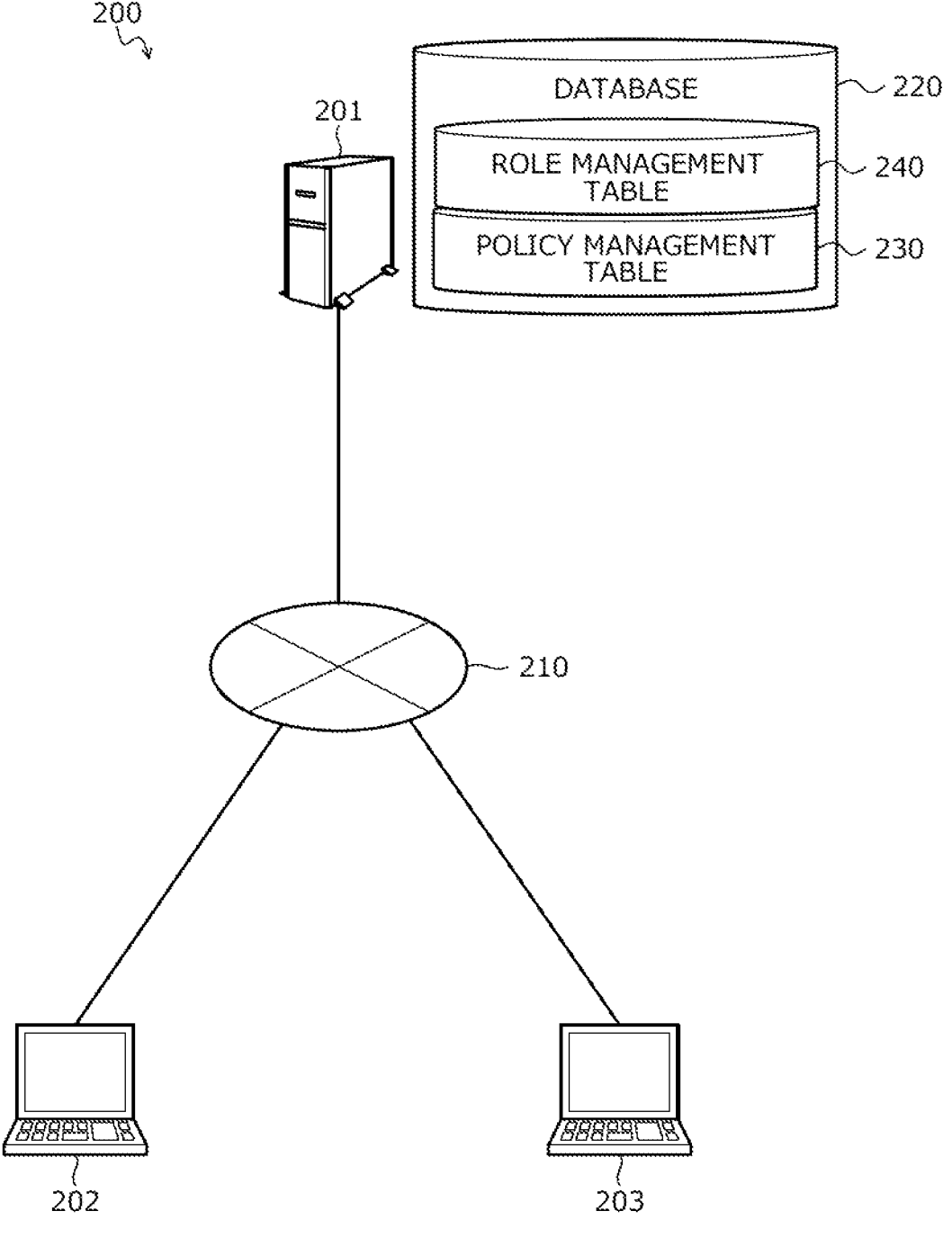
FIG. 2 is an explanatory diagram illustrating a system configuration example of an information processing system 200.

There is related art that specifies a role stored in an operation environment database (DB) from an operation environment where an application is executed, in a case where the application accesses a resource, specifies access control information associated with the specified role from an access control DB, and performs access control on the resource, based on the specified access control information. The operation environment DB stores a role of a user in association with the operation environment where the application is executed. The access control DB stores the access control information in association with the role of the user.

However, the related art has a problem in that a load on implementation and monitoring of appropriate access control based on a standard rule of security certification increases, for a table in a database.

In one aspect, an object of the embodiment is to easily specify content of appropriate access control for each role of a target table.

Hereinafter, embodiments of a database management program, a database management method, and an information processing device will be described in detail with reference to the drawings.

EMBODIMENT

Figure 1:
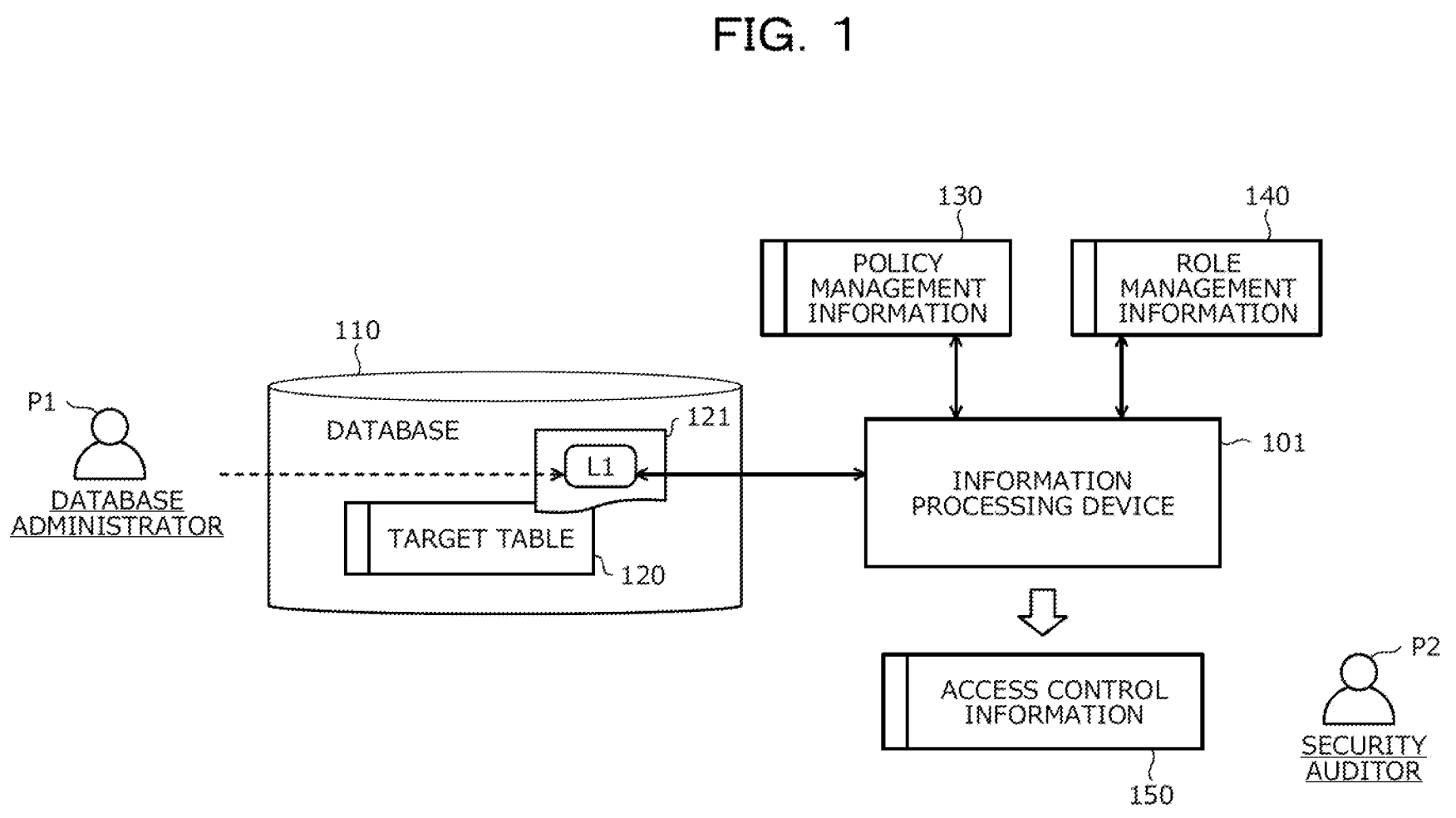

FIG. 1 is an explanatory diagram illustrating an example of a database management method according to an embodiment. In FIG. 1, an information processing device 101 is a computer that assists access control with respect to a target table to be an access control target on a database. The access control is to limit a user who can access a database or to limit a range to which a user can access. For example, the access control is performed by assigning an access authority such as writing or raw data reading, for each accessible role.

What type of access control is performed depends on, for example, a standard rule of security certification required for a system and data stored in the system. The standard rule of the security certification includes, for example, an information system security management and assessment program (ISMAP) management standard and a general data protection rule (GDPR).

Taking the general data protection rule as an example, it is necessary to take measures such as limiting users who can access a table or assigning only an authority that the user needs, in order to protect access control written in articles. For example, regarding personal information of a European Union (EU) resident, access control is required that permits writing from an administrator's role and reference to raw data, permits reference to an anonymized table from a reference role, and does not permit any other operations from the roles.

Typically, a database administrator has designed the access control for each table, in consideration of a data type to be stored in a table, access control conforming to the standard rule of the security certification, a role that uses the table, or the like. Then, a system builder or the like has manually performed the access control for each table, according to the design of the database administrator.

Note that implementation of the access control is, for example, to issue a command such as a GRANT statement and set a range of an access authority to a specific role.

On the other hand, when the access control is performed according to the design of the database administrator, there is a possibility that a human error such as erroneous setting of access authorities or setting omission occurs. Therefore, a security auditor confirms an access control status and audits whether the access control conforming to the standard rule of the security certification is performed.

However, in the related art, it takes time and effort to implement and audit the access control according to the security protocol. For example, each time when a new table is added, the database administrator confirms the data type to be stored in the table and the content of the access control conforming to the standard rule of the security certification and designs the access control.

Therefore, as a frequency of adding a table and the number of roles in the database increase, a load on the design of the access control increases. Furthermore, in a case where the security protocol is changed, in order to determine access control of which table is corrected, it is necessary to confirm each data type of each record stored in the table.

Furthermore, for example, the security auditor confirms a current access control status for each table and visually confirms whether the access control according to the standard rule of the security certification is performed. Therefore, as the number of tables or roles increases, the number of access controls to be confirmed increases, and there is an increasing possibility that a human error such as oversight of inappropriate access control occurs.

Furthermore, in a case where the security protocol is changed, in order to determine an access control status of which table should be confirmed, it is necessary to confirm each data type of each record stored in the table. For this reason, a function is desired for supporting a database operation according to the access control determined based on the security protocol.

Therefore, in the present embodiment, a database management method will be described that reduces a load on implementation and monitoring of access control according to a security protocol, by enabling to easily specify content of appropriate access control for each role in a target table. Here, processing examples of the information processing device 101 (corresponding to (1) to (3) below) will be described.

(1) The information processing device 101 stores a first policy label L1 according to a data type stored in a target table 120, in metadata 121 of the target table 120. Here, the target table 120 is a table to be an access control target in a database 110. The metadata 121 is information representing an attribute of the target table 120 and is, for example, data representing information regarding an object in a database managed by a system catalog.

The first policy label L1 is assigned, for example, by a database administrator P1. For example, the database administrator P1 assigns an appropriate policy label to the target table 120, in consideration of data to be stored in the target table 120. Then, the information processing device 101 stores the assigned first policy label L1 in the metadata 121 of the target table 120.

(2) The Information processing device 101 refers to policy management information 130 and specifies content of access control that should be performed on each role pattern corresponding to the first policy label L1 stored in the metadata 121. Here, the policy management information 130 is information defining content of access control that should be performed on each role pattern that has been determined in advance, for each of a plurality of policy labels. Each of the plurality of policy labels represents a data type. The plurality of policy labels includes, for example, the first policy label L1.

The role pattern represents a role of a role in a table in a database. As the role pattern, for example, a data administrator, a Web application user, a batch application user, or the like are exemplified. The access control on the table of each role can be patterned for each role of the role in the table. The content of the access control that should be performed on each role pattern is, for example, determined according to a standard rule (security protocol) of security certification to be acquired by a system.

Here, the information processing device 101 represents the role of the role in each table as a "role pattern (role template), and manages the content of the access control that should be performed, for each role pattern, in association with the policy label, in the policy management information 130. The content of the access control is represented by, for example, presence or absence of an authority (authority range) of writing on data of a data type indicated by the policy label, referring to raw data, or the like.

(3) The information processing device 101 creates access control information 150, based on the specified content of the access control that should be performed on each role pattern, with reference to role management information 140. Here, the role management information 140 is information representing a correspondence between each role pattern and one or more roles in the target table 120.

The role management information 140 is created, for example, by the database administrator P1. For example, the information processing device 101 specifies each role pattern corresponding to the first policy label L1, with reference to the policy management information 130. Next, the information processing device 101 receives designation of the one or more roles corresponding to each specified role pattern, in the target table 120.

For example, the information processing device 101 receives the designation of the one or more roles corresponding to each role pattern from the database administrator P1, by notifying the database administrator P1 of each specified role pattern, in the target table 120. Then, the information processing device 101 creates the role management information 140 in which each role pattern in the target table 120 is associated with the one or more designated roles.

Furthermore, the access control information 150 is information representing content of access control that should be performed on the role, for each role in the target table 120. For example, the information processing device 101 creates the access control information 150, by associating the content of the access control that should be performed on each specified role pattern with the role corresponding to the each role pattern.

In this way, according to the information processing device 101, it is possible to easily specify the content of the appropriate access control for each role in the target table 120. As a result, the information processing device 101 can reduce the load on the implementation and the monitoring of the access control according to the security protocol.

For example, when creating the target table 120, the database administrator P1 can refer to the access control information 150 and easily specify the content of the access control that should be performed on each role of the target table 120. As a result, the database administrator P1 can reduce the trouble of designing the access control for each role according to the security protocol and reduce the load on the implementation of the access control. Furthermore, the database administrator P1 can prevent design errors and implementation errors in the access control.

Furthermore, a security auditor P2 can confirm whether access control according to the standard rule of the security certification is performed, using the access control information 150. Furthermore, by confirming a policy label in a case where the security protocol is changed or the like, the security auditor P2 can easily specify a table to be monitored and can reduce loads on access control status confirmation.

(System Configuration Example of Information Processing System 200)

Next, a system configuration example of an information processing system 200 including the information processing device 101 illustrated in FIG. 1 will be described. In the following description, a case will be described as an example where the information processing device 101 illustrated in FIG. 1 is applied to a database management device 201 in the information processing system 200. The information processing system 200 is applied, for example, to a database system required to acquire security certification.

FIG. 2 is an explanatory diagram illustrating a system configuration example of the information processing system 200. In FIG. 2, the information processing system 200 includes the database management device 201, an administrator's terminal 202, and an auditor's terminal 203. In the information processing system 200, the database management device 201, the administrator's terminal 202, and the auditor's terminal 203 are coupled via a wired or wireless network 210. For example, the network 210 is the Internet, a local area network (LAN), a wide area network (WAN), or the like.

Here, the database management device 201 is a computer that manages a database 220. The database management device 201 includes a policy management table 230 and a role management table 240 and assists access control on a table (target table) to be an access control target in the database 220. The database management device 201 is, for example, a database server.

The database 110 illustrated in FIG. 1 corresponds to the database 220, for example. Note that storage content of the policy management table 230 and the role management table 240 will be described later with reference to FIGS. 4 and 5.

The administrator's terminal 202 is a computer used by the database administrator P1. Furthermore, the auditor's terminal 203 is a computer used by the security auditor P2. The administrator's terminal 202 and the auditor's terminal 203 are, for example, personal computers (PC), tablet terminals, or the like.

Note that, here, only one administrator's terminal 202 and only one auditor's terminal 203 are displayed. However, the embodiment is not limited to this. For example, a plurality of administrator's terminals 202 and auditor's terminals 203 may be included in the information processing system 200.

(Hardware Configuration Example of Database Management Device 201)

Next, a hardware configuration example of the database management device 201 will be described.

Figure 3:
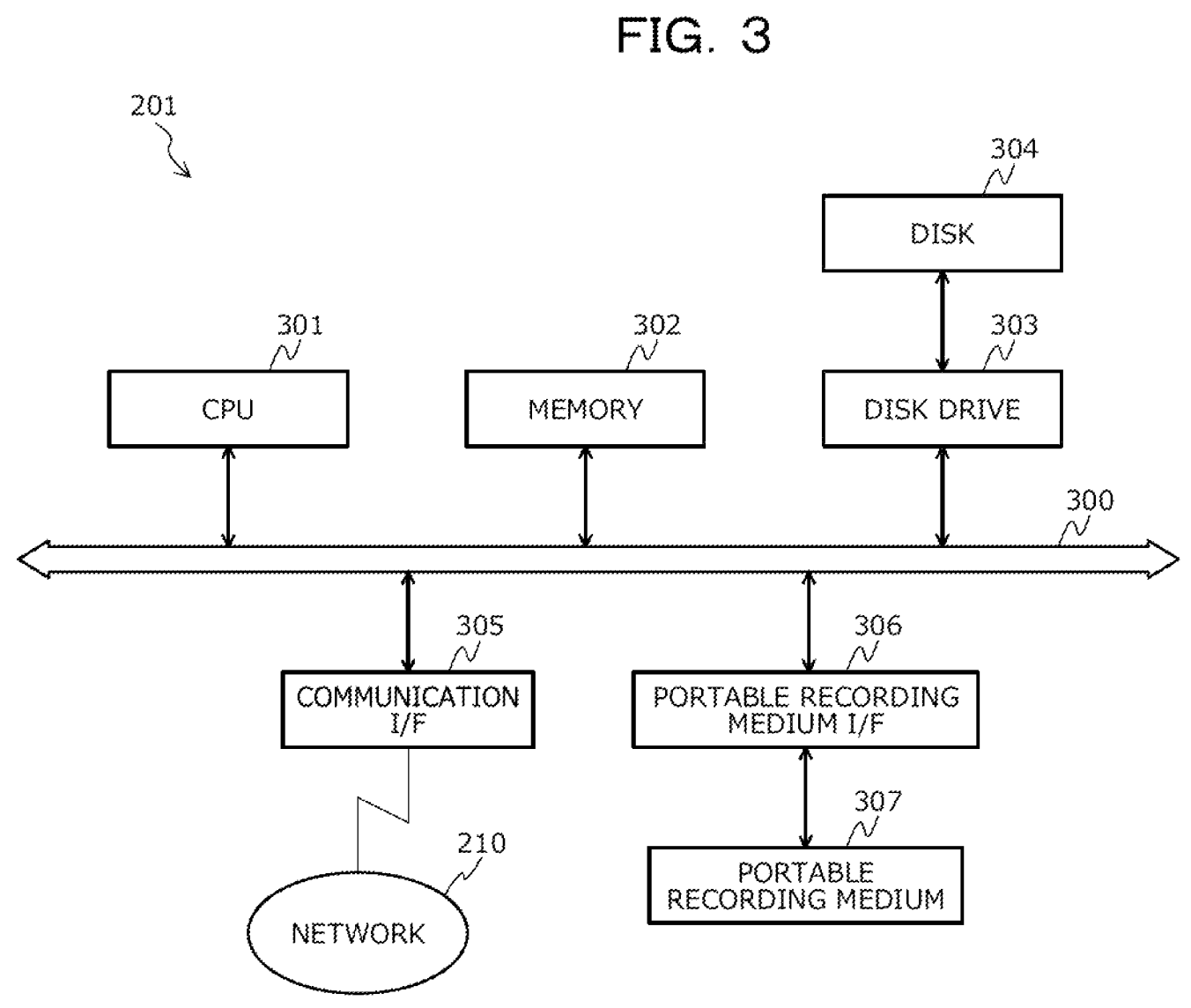

FIG. 3 is a block diagram illustrating the hardware configuration example of the database management device 201. In FIG. 3, the database management device 201 includes a central processing unit (CPU) 301, a memory 302, a disk drive 303, a disk 304, a communication interface (I/F) 305, a portable recording medium I/F 306, and a portable recording medium 307. Furthermore, the individual components are coupled to each other by a bus 300.

Here, the CPU 301 controls the entire database management device 201. The CPU 301 may include a plurality of cores. The memory 302 includes, for example, a read only memory (ROM), a random access memory (RAM), a flash ROM, and the like. For example, the flash ROM stores operating system (OS) programs, the ROM stores application programs, and the RAM is used as a work area for the CPU 301. The program stored in the memory 302 is loaded to the CPU 301 to cause the CPU 301 to execute coded processing.

The disk drive 303 controls reading/writing of data from/to the disk 304 under the control of the CPU 301. The disk 304 stores data written under the control of the disk drive 303. For example, the disk 304 is a magnetic disk, an optical disk, or the like.

The communication I/F 305 is coupled to the network 210 through a communication line and is coupled to an external computer (for example, administrator's terminal 202 and auditor's terminal 203 illustrated in FIG. 2) via the network 210. Then, the communication I/F 305 controls an interface between the network 210 and the inside of the device and controls input/output of data to/from the external computer. The communication I/F 305 is, for example, a modem, a LAN adapter, or the like.

The portable recording medium I/F 306 controls reading/writing of data from/to the portable recording medium 307 under the control of the CPU 301. The portable recording medium 307 stores data written under the control of the portable recording medium I/F 306. The portable recording medium 307 is, for example, a compact disc (CD)-ROM, a digital versatile disk (DVD), a universal serial bus (USB) memory, or the like.

Note that the database management device 201 may include, for example, an input device, a display, or the like, in addition to the components described above. Furthermore, the database management device 201 does not need to include, for example, the portable recording medium I/F 306 and the portable recording medium 307, among the components described above. Furthermore, the administrator's terminal 202 and the auditor's terminal 203 illustrated in FIG. 2 can be implemented with a hardware configuration similar to that of the database management device 201. However, the administrator's terminal 202 and the auditor's terminal 203 include, for example, an input device, a display, or the like, in addition to the components described above.

(Storage Content of Policy Management Table 230 And Role Management Table 240)

Next, storage content of the policy management table 230 and the role management table 240 included in the database management device 201 will be described with reference to FIGS. 4 and 5. The policy management table 230 and the role management table 240 are implemented by a storage device such as the memory 302 or the disk 304, for example.

FIG. 4 is an explanatory diagram illustrating an example of the storage content of the policy management table 230. In FIG. 4, the policy management table 230 has fields of a policy label, a role pattern, writing, raw data reading, masking, and file encryption and stores policy management information (for example, policy management information 400-1 and 400-2), by setting information in each field, as a record. The policy management information 130 illustrated in FIG. 1 corresponds to, for example, the policy management table 230.

Here, the policy label indicates a data type stored in a table in the database 220 (refer to FIG. 2). For example, a policy label "EU resident_personal information" indicates a data type indicating personal information of an EU resident. The role pattern represents a role of a role in the table in the database 220. The role pattern is, for example, a data administrator, a Web application user, a batch application user, or the like.

The writing, the raw data reading, and the masking represent content of access control that should be performed on each role pattern. The writing indicates whether or not to permit data writing. The writing "o" indicates that the data writing is permitted. The writing "x" indicates that the data writing is not permitted. The raw data reading indicates whether or not to permit raw data reading. The raw data reading "o" indicates that the raw data reading is permitted. The raw data reading "x" indicates that the raw data reading is not permitted.

The masking indicates whether or not to permit reading of masked data. The masking "o" indicates that the reading of the masked data is permitted. The masking "x" indicates that the reading of the masked data is not permitted. The file encryption indicates whether or not data encryption is required. The file encryption "o" indicates that data encryption in the database 220 is required. The file encryption "x" indicates that the data encryption is not required.

For example, the policy management information 400-1 indicates content of access control that should be performed on each role pattern and whether or not file encryption is required, for the data with the policy label "EU resident_personal information". Taking the role pattern "data administrator" as an example, the policy management information 400-1 indicates that the writing is permitted, the raw data reading is permitted, and the masked data reading is not permitted, for the data with the policy label "EU resident_personal information".

In the following description, the rule (content) of access control that should be performed on each role pattern determined according to the data type (policy label) may be referred to as a "security policy".

FIG. 5 is an explanatory diagram illustrating an example of the storage content of the role management table 240. In FIG. 5, the role management table 240 has fields of a table, a role pattern, and a role, and stores role management information 500-1 to 500-4 as records, by setting information in each field. The role management information 140 illustrated in FIG. 1 corresponds to, for example, the role management table 240.

Here, the table is a name of a table (target table) to be an access control target in the database 220. The role pattern represents a role of a role in the table in the database 220. The role is a role that uses the table in the database 220. The role pattern corresponds to a template of a role. The roll corresponds to a specific role (for example, user, application, or the like) corresponding to the role pattern.

For example, the role management information 500-1 indicates a correspondence between a role pattern "data administrator" and a role "sales promotion_administrator" in a table "questionnaire information_EU". Furthermore, the role management information 500-1 indicates a correspondence between a role pattern "Web application user" and a role "seminar_APL1" in the table "questionnaire information_EU". Furthermore, the role management information 500-1 indicates a correspondence between a role pattern "batch application user" and a role "seminar_batch1" in the table "questionnaire information_EU".

Note that, in the example in FIG. 5, a case has been described where one role is associated with each role pattern. However, the embodiment is not limited to this. For example, two or more roles may be associated with each role pattern.

(Functional Configuration Example of Database Management Device 201)

Next, a functional configuration example of the database management device 201 will be described.

Figure 6:
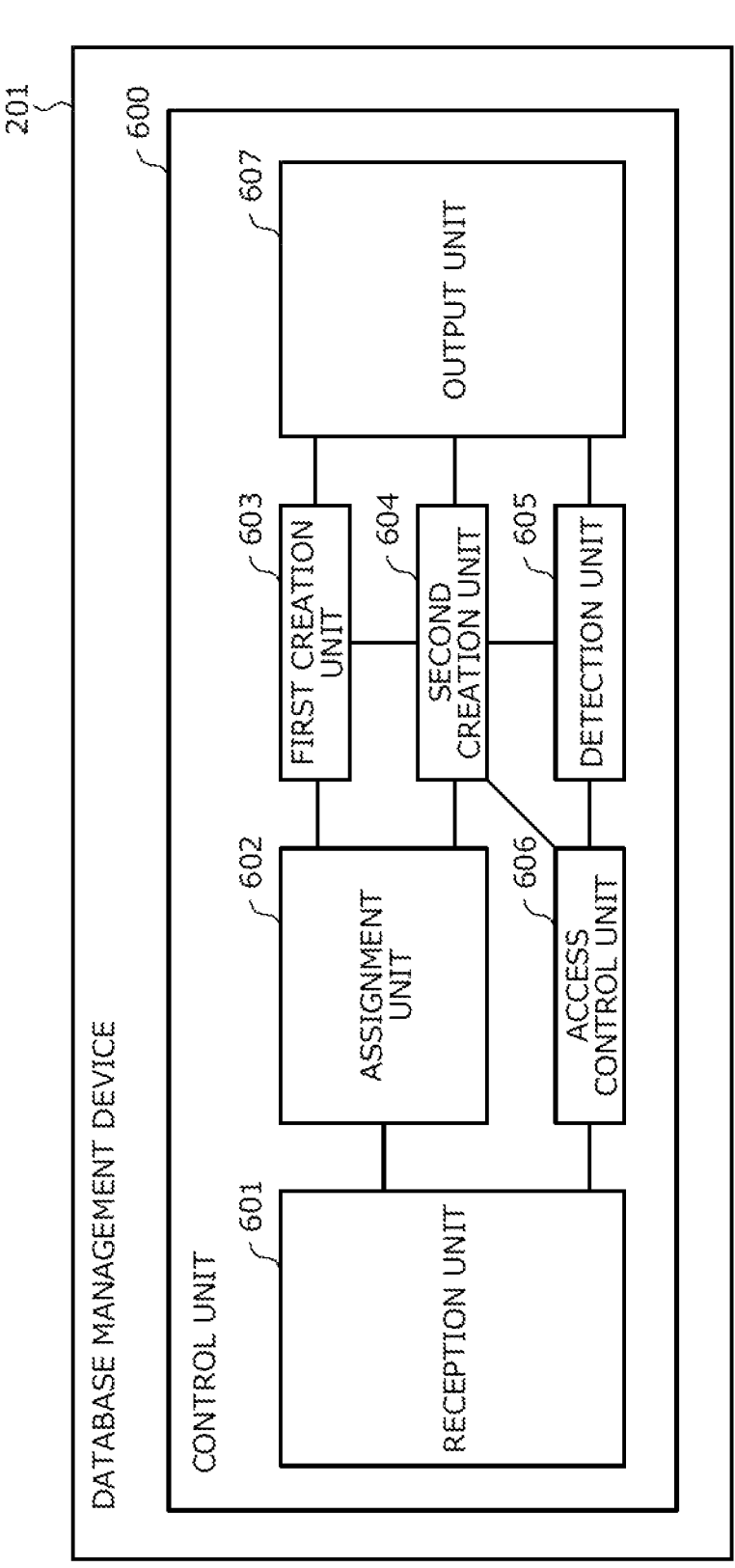
FIG. 6 is a block diagram illustrating a functional configuration example of the database management device 201.

FIG. 6 is a block diagram illustrating a functional configuration example of the database management device 201. In FIG. 6, the database management device 201 includes a reception unit 601, an assignment unit 602, a first creation unit 603, a second creation unit 604, a detection unit 605, an access control unit 606, and an output unit 607. The reception unit 601 to the output unit 607 have functions serving as a control unit 600, and for example, those functions are implemented by causing the CPU 301 to execute the program stored in the storage device such as the memory 302, the disk 304, or the portable recording medium 307 illustrated in FIG. 3, or by the communication I/F 305, for example. A processing result of each functional unit is stored, for example, in a storage device such as the memory 302 or the disk 304.

The reception unit 601 receives a first policy label according to a data type stored in a target table to be an access control target in the database 220. For example, the first policy label is designated, for example, by the database administrator P1 in consideration of data to be stored in the target table. For example, the reception unit 601 receives a first policy label according to a data type to be stored in a new table, from the administrator's terminal 202 illustrated in FIG. 2, at the time of creating the new table (target table).

The assignment unit 602 stores the received first policy label in metadata of the target table. The metadata of the target table is, for example, metadata in a Postgre structured query language (SQL) and is managed by a system catalog. For example, at the time of creating a new table (target table), the assignment unit 602 adds the received first policy label to the metadata of the target table in the system catalog.

As a result, for example, the assignment unit 602 can assign the first policy label according to the data type to be stored in the new table at the time of creating the new table. Note that an example of storage of the first policy label will be described later with reference to FIG. 8.

The first creation unit 603 creates role management information representing a correspondence between each role pattern and one or more roles in the target table. For example, the first creation unit 603 refers to the policy management information and specifies each role pattern corresponding to the first policy label.

Here, the policy management information is information defining content of access control that should be performed on each role pattern, for each policy label representing the data type. The policy management information is, for example, the policy management table 230 illustrated in FIG. 4.

For example, the first policy label is set as "EU resident_ personal information". In this case, the first creation unit 603 refers to the policy management table 230 and specifies each role pattern "data administrator, Web application user, and batch application user" corresponding to the first policy label "EU resident_personal information".

Next, the first creation unit 603 receives designation of one or more roles corresponding to each specified role pattern, in the target table. The designation of the one or more roles corresponding to each role pattern is performed, for example, by the database administrator P1. Then, the first creation unit 603 creates role management information in which each role pattern in the target table and the one or more designated roles are associated.

The created role management information is, for example, stored in the role management table 240 illustrated in FIG. 5. Note that an example of creating the role management information will be described later with reference to FIG. 9.

The second creation unit 604 creates access control information representing content of access control that should be performed on the role, for each role in the target table. For example, the second creation unit 604 refers to the policy management table 230 and specifies the content of the access control that should be performed on each role pattern corresponding to the first policy label stored in the metadata of the target table.

Then, the second creation unit 604 refers to the role management table 240 and creates the access control information representing the content of the access control that should be performed on the role, for each role in the target table, based on the specified content of the access control that should be performed on each role pattern.

The access control information is created, for example, at the time when a new table is created or an access control status is monitored. At the time when the new table is created, the new table is the target table. At the time when the access control status is monitored, for example, each table in the database 220 is the target table. An example of creating the access control information will be described later with reference to FIGS. 10 and 11.

The output unit 607 outputs the created access control information. An output format of the output unit 607 includes, for example, storing the information in a storage device such as the memory 302 or the disk 304, transmitting the information to another computer by the communication I/F 305, displaying the information on a display (not illustrated), outputting the information to a printer (not illustrated), or the like.

For example, the output unit 607 may transmit the created access control information to the administrator's terminal 202 at the time when the new table is created. As a result, the database management device 201 can provide information that can specify the content of the access control that should be performed on each role in the new table, to the database administrator P1.

Furthermore, the output unit 607 may transmit the created access control information to the auditor's terminal 203 (refer to FIG. 2), at the time when the access control status is monitored. As a result, the database management device 201 can provide information that can specify the content of the access control that should be performed on each role in each table in the database 220, to the security auditor P2.

The detection unit 605 refers to the access control status with respect to the target table in the database 220 and creates access control execution information. Here, the access control execution information is information representing content of access control performed on the role, for each role in the target table.

The access control status with respect to the target table is, for example, specified from system information that can specify an access control status with respect to each table in the database 220. The system information is, for example, a system table (not illustrated) that can specify the access control status for each object in the database 220. The system table is stored, for example, in the database 220.

Then, the detection unit 605 detects a difference portion with respect to the access control information in the access control execution information, based on a comparison result of comparing the access control information with the access control execution information. Here, the difference portion corresponds to a portion where appropriate access control (for example, access control according to security protocol) is not performed.

The processing by the detection unit 605 is executed, for example, at the time when the access control status is monitored. The processing by the detection unit 605 may be periodically executed, for example, every certain period (one week, one month, or the like). An example of creating the access control execution information will be described later with reference to FIGS. 12 and 13. Furthermore, an example of detecting the difference portion will be described later with reference to FIGS. 14 and 15.

The output unit 607 outputs a difference detection result. Here, the difference detection result is, for example, information that can specify the detected difference portion (table name, data type, role name, or the like). Furthermore, in a case where the difference portion is not detected, the difference detection result may be information indicating that no difference portion is detected.

For example, the output unit 607 may transmit the difference detection result to the auditor's terminal 203, at the time when the access control status is monitored. As a result, the database management device 201 can provide information that can specify a portion where the appropriate access control (for example, access control according to security protocol) is not performed, to the security auditor P2.

When receiving a login request from a first role to the database 220, the access control unit 606 determines whether or not the first role is a role corresponding to the detected difference portion. The first role is a role that is permitted to log in, in setting of the database 220.

The login request includes, for example, information for specifying the first role (table name, role name, or the like). The login request is received, for example, by the reception unit 601, from a computer used by a user corresponding to the first role or from a computer for executing an application corresponding to the first role.

Then, in a case where the first role is the role corresponding to the difference portion, the access control unit 606 may reject the login of the first role. On the other hand, in a case where the first role is not the role corresponding to the difference portion, the access control unit 606 may permit the login of the first role.

As a result, the database management device 201 can reject login of a role (first role) that violates the security policy, to the database 220. An example of rejecting the login will be described later with reference to FIG. 14.

Note that the processing by the detection unit 605 may be executed, for example, when the login request is received. For example, the detection unit 605 may create the access control execution information with reference to the system information (for example, system table) when the login request is received. Then, the detection unit 605 detects a difference portion with respect to the access control information in the access control execution information, based on a comparison result of comparing the access control information with the access control execution information.

As a result, the database management device 201 can determine the role (first role) that violates the security policy, in consideration of the latest access control status.

Furthermore, the access control unit 606 may refer to the created access control information and correct content of access control to be performed on a second role corresponding to the detected difference portion, in the target table. For example, the access control unit 606 refers to the access control information and specifies the content of the access control that should be performed on the second role in the target table.

Then, the access control unit 606 sets the specified content of the access control to the second role, by operating the database 220, using a GRANT statement, a REVOKE statement, or the like. The GRANT statement is one of syntaxes prepared for the SQL and is used to set an authority to a user of a database. The REVOKE statement is one of syntaxes prepared for the SQL and is used to delete the authority granted by the GRANT statement. The authority changed using the GRANT statement, the REVOKE statement, or the like is reflected in the system table of the database 220.

(Operation Example of Database Management Device 201)

Next, an operation example of the database management device 201 will be described with reference to FIG. 7. Here, a case will be described as an example where the functional unit (reception unit 601 through output unit 607) illustrated in FIG. 6 is implemented by an access control assistance function 700 of the database management device 201.

Figure 7:
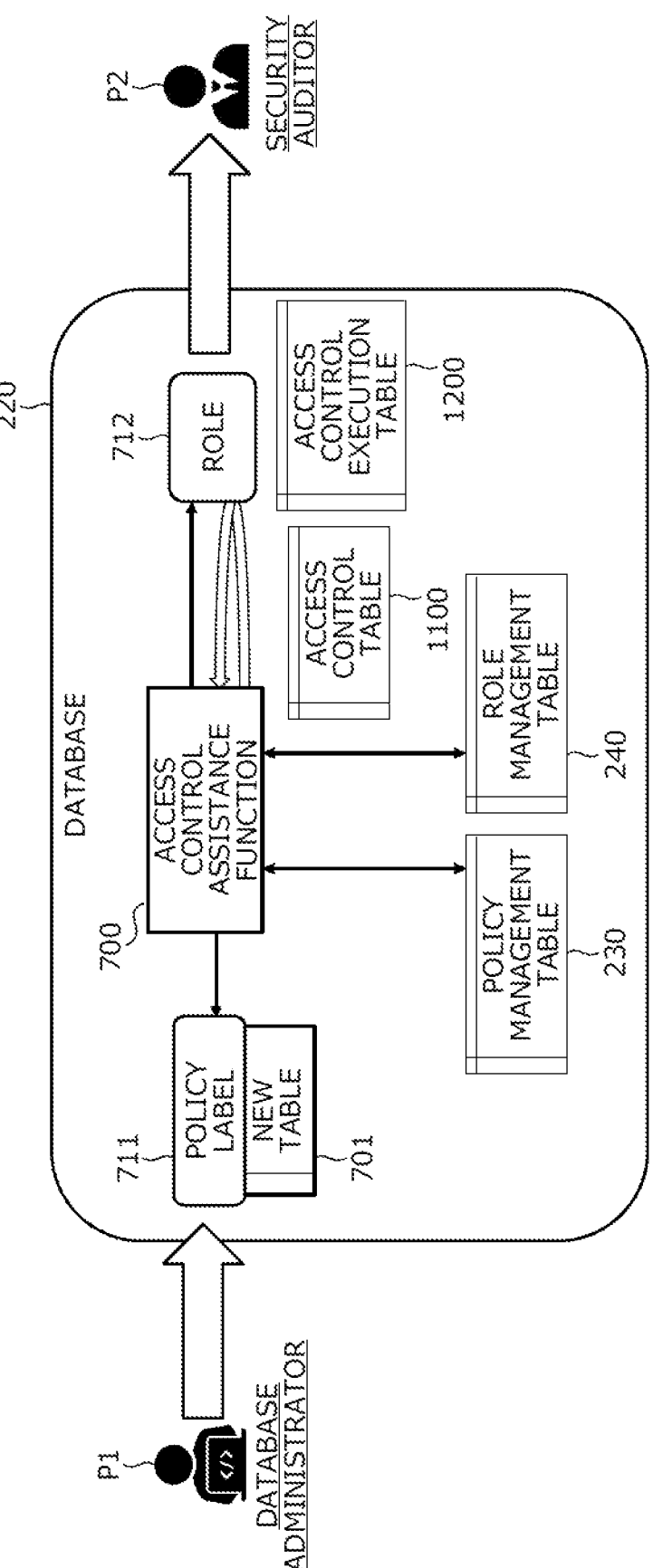
FIG. 7 is an explanatory diagram illustrating an operation example of the database management device 201.

FIG. 7 is an explanatory diagram illustrating the operation example of the database management device 201. First, an operation example of the database management device 201 when a new table is created will be described.

The database administrator P1 creates a new table 701, using the administrator's terminal 202. At this time, the database administrator P1 assigns a policy label 711 to the new table 701, in consideration of a data type to be stored in the new table 701. The policy label 711 is information indicating the data type to be stored in the new table 701 and is stored in metadata of the new table 701.

A specific example of the metadata of the new table 701 will be described later with reference to FIG. 8.

Next, the access control assistance function 700 refers to the policy management table 230 and specifies a role pattern corresponding to the assigned policy label 711. The access control assistance function 700 notifies the database administrator P1 of the specified role pattern for the new table 701, and requests the database administrator P1 to designate a role to be added to the role management table 240.

The database administrator P1 adds a correspondence between the new table 701, the role pattern, and the role to the role management table 240, in response to the request from the access control assistance function 700, using the administrator's terminal 202. As a result, role management information representing the correspondence between each role pattern and the one or more roles in the new table 701 is created in the role management table 240.

A specific example of the role management information will be described later with reference to FIG. 9.

Next, the access control assistance function 700 combines the policy management table 230 and the role management table 240 so as to create access control information. The access control information represents content of access control that should be performed on the role, for each role in the new table 701.

For example, the access control assistance function 700 refers to the policy management table 230 and specifies the content of the access control that should be performed on each role pattern corresponding to the policy label 711 of the new table 701. The access control assistance function 700 refers to the role management table 240 and creates access control information, based on the specified content of the access control that should be performed on each role pattern.

Then, the access control assistance function 700 presents the created access control information to the database administrator P1. The database administrator P1 can refer to the presented access control information and perform the access control on each role 712 in the new table 701.

The created access control information is stored, for example, in an access control table 1100. An example of creating the access control information will be described later with reference to FIGS. 10 and 11.

Next, an operation example of the database management device 201 when an access control status with respect to each table in the database 220 is monitored will be described.

The access control assistance function 700 combines the policy management table 230 and the role management table 240 and creates the access control table 1100. The access control table 1100 stores access control information (for example, refer to FIG. 11 to be described later) for each table (target table) in the database 220.

Next, the access control assistance function 700 copies the created access control table 1100 so as to create an access control execution table 1200. Then, the access control assistance function 700 refers to the system table (not illustrated), confirms a current access control status, and updates the access control execution table 1200 according to the confirmed result.

A specific example of the access control execution table 1200 will be described later with reference to FIG. 12. Furthermore, an example of the update of the access control execution table 1200 will be described later with reference to FIG. 13.

Next, the access control assistance function 700 takes a diff (difference) between the access control table 1100 and the access control execution table 1200. Here, in a case where diff is output, it is assumed that appropriate access control be not performed, and for example, the access control assistance function 700 or the security auditor P2 executes appropriate processing.

(Example of Storage of First Policy Label)

An example of storage of the first policy label will be described, with reference to FIG. 8.

FIG. 8 is an explanatory diagram illustrating an example of the storage of the first policy label. In FIG. 8, a system catalog 800 stores metadata of an object in the database 220. The metadata includes, for example, information such as oid, tablename, tablenamespace, or tableowner.

The reference oid indicates an id of an object. The reference tablename indicates a name of a table. The reference tablenamespace indicates a namespace of the table. The reference tableowner indicates an owner of the table. For example, metadata 800-1 indicates oid "16393", tablename "questionnaire information", tablenamespace "99", and tableowner "10" in the database 220.

A table with the tablename "questionnaire information" is an example of the target table (for example, new table 701 illustrated in FIG. 7). Here, a case is assumed where the policy label "EU resident_personal information" is assigned to the table with the tablename "questionnaire information".

In this case, the access control assistance function 700 (refer to FIG. 7) adds the policy label "EU resident_personal information" to be assigned to the table with the tablename "questionnaire information", to the metadata 800-1 in the system catalog 800. For example, the access control assistance function 700 (refer to FIG. 7) adds the policy label "EU resident_personal information" to the metadata 800-1, using a CREATE statement.

As a result, the access control assistance function 700 can store the policy label "EU resident_personal information", in the metadata 800-1 of the table with the tablename "questionnaire information".

(Example of Creating Role Management Information)

Next, an example of creating the role management information will be described with reference to FIG. 9.

Figure 9:
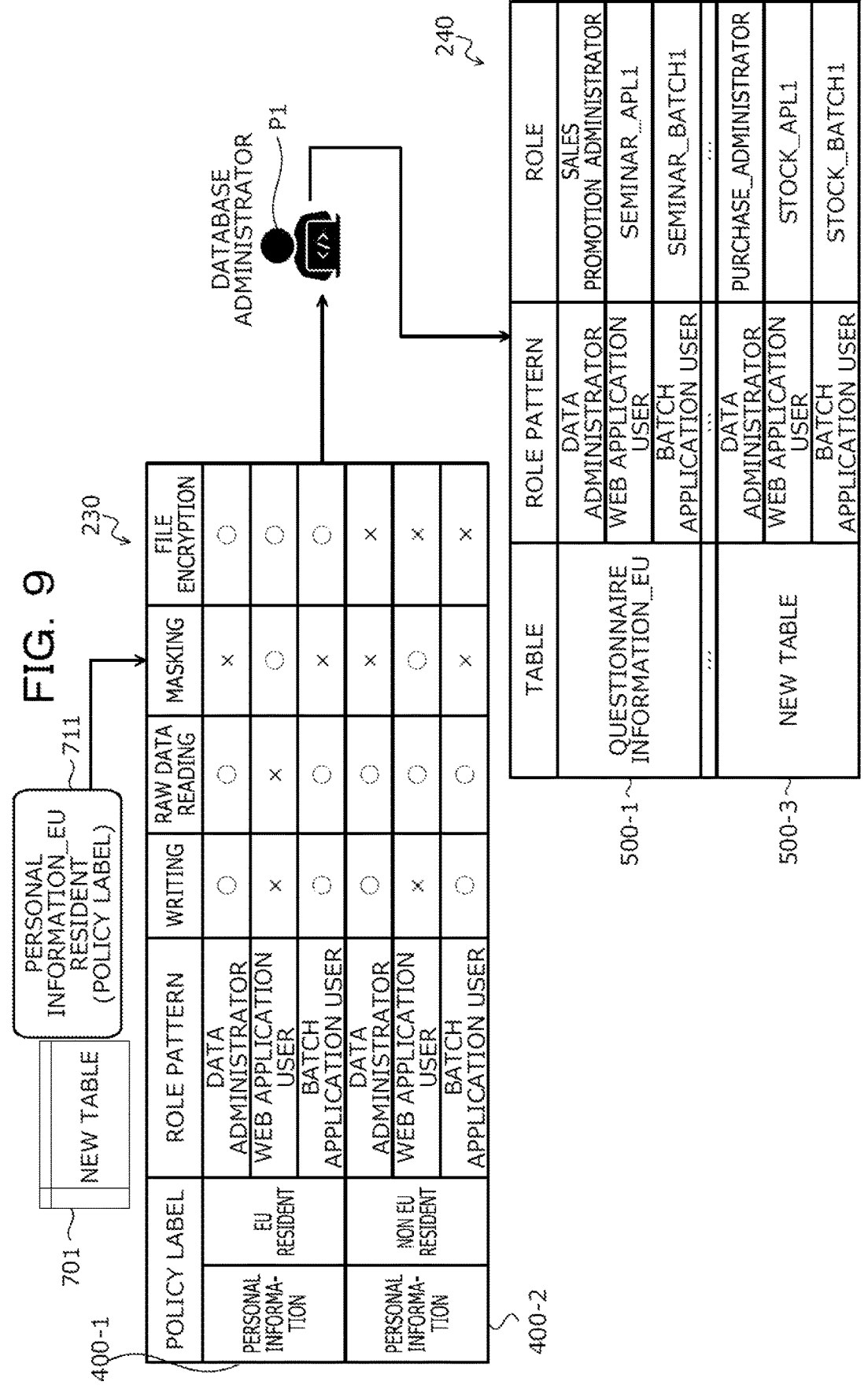
FIG. 9 is an explanatory diagram illustrating an example of creating role management information.

FIG. 9 is an explanatory diagram illustrating an example of creating the role management information. In FIG. 9, a case is assumed where the policy label 711 "EU resident_personal information" is assigned to the new table 701. The new table 701 is, for example, the table with the tablename "questionnaire information".

In this case, the access control assistance function 700 refers to the policy management information 400-1 corresponding to the policy label 711 in the policy management table 230 and specifies a role pattern corresponding to the policy label 711. Here, the role pattern "data administrator, Web application user, and batch application user" is specified.

Next, the access control assistance function 700 notifies the database administrator P1 of the role pattern "data administrator, Web application user, and batch application user" about the new table 701. As a result, the access control assistance function 700 requests to designate a role to be added to the role management table 240.

The database administrator P1 adds a correspondence between each role pattern "data administrator, Web application user, and batch application user" and one or more roles about the new table 701, to the role management table 240. A correspondence between a role pattern "data administrator" and a role "purchase_administrator" is added.

Furthermore, a correspondence between the role pattern "Web application user" and a role "stock_APL1" is added. Furthermore, a correspondence between the role pattern "batch application user" and a role "stock_batch1" is added. As a result, role management information 500-3 about the new table 701 is added to the role management table 240.

(Example of Creating Access Control Information)

Next, an example of creating the access control information will be described with reference to FIGS. 10 and 11.

Figure 10:
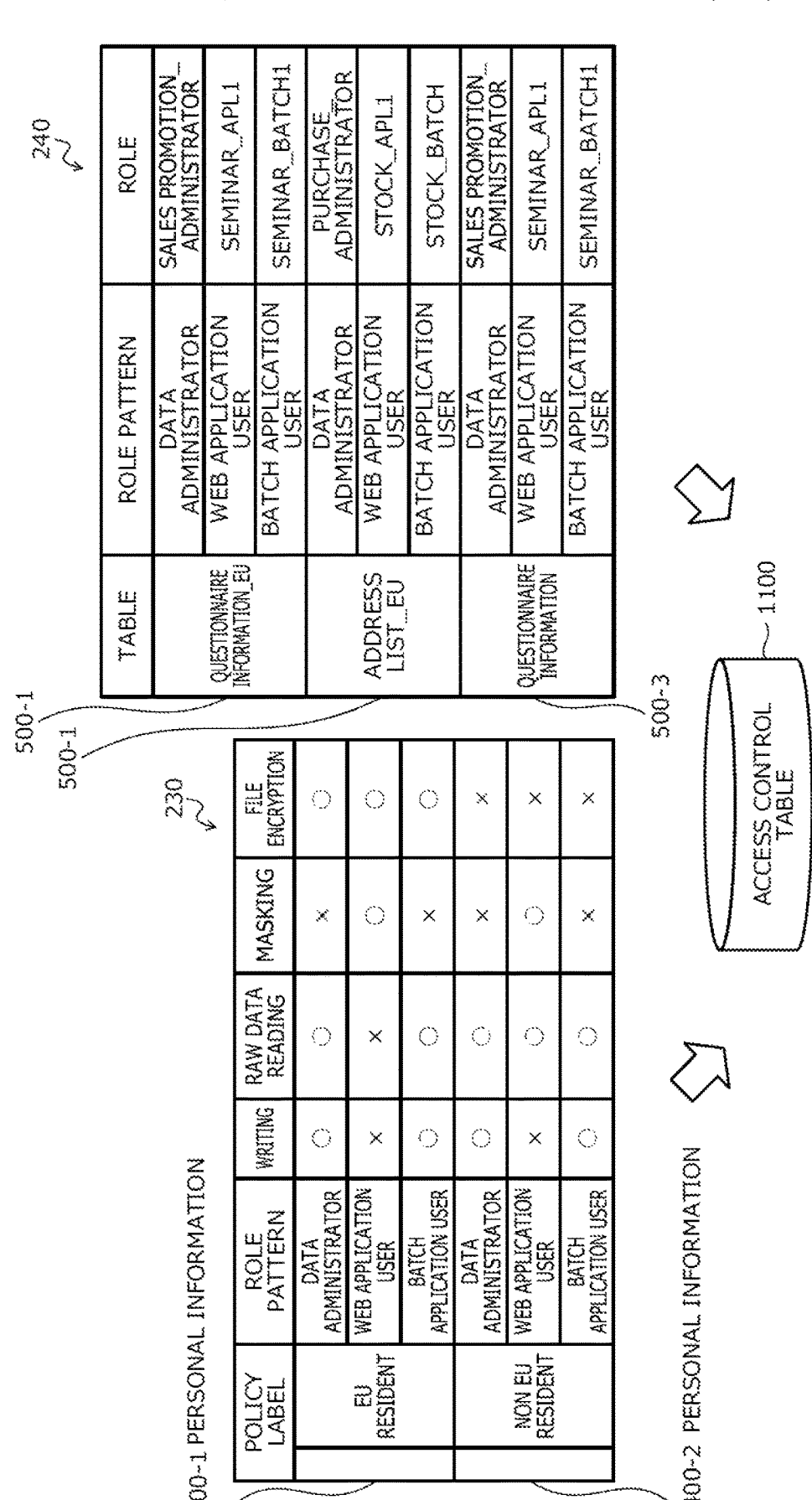
FIG. 10 is an explanatory diagram illustrating an example of creating access control information.

FIG. 10 is an explanatory diagram illustrating an example of creating the access control information. In FIG. 10, the access control assistance function 700 combines the policy management table 230 and the role management table 240 and creates the access control table 1100 illustrated in FIG. 11.

Taking the table "questionnaire information_EU" to which the policy label "EU resident_personal information" is assigned as an example, an example of creating the access control information stored in the access control table 1100 will be described.

In this case, the access control assistance function 700 specifies the policy management information 400-1 corresponding to the policy label "EU resident_personal information", from the policy management table 230. Then, the access control assistance function 700 refers to the policy management information 400-1 and specifies content of access control that should be performed on each role pattern corresponding to the policy label "EU resident_personal information".

Taking the role pattern "data administrator" as an example, content "writing: o, raw data reading: o, masking: x, file encryption: o" of access control that should be performed on the role pattern "data administrator" is specified.

The access control assistance function 700 refers to the role management table 240 and creates access control information, based on the specified content of the access control that should be performed on each role pattern. For example, the access control assistance function 700 specifies a role corresponding to each role pattern, with reference to the role management table 240. Then, the access control assistance function 700 creates the access control information, by associating the specified content of the access control that should be performed on each role pattern with the specified role corresponding to each role pattern.

Here, taking the role pattern "data administrator" as an example, a role corresponding to the role pattern "data administrator" is "sales promotion_administrator". In this case, access control information 1100-1 as illustrated in FIG. 11 is created, by associating the content "writing: o, raw data reading: o, masking: x, file encryption: o" of the access control that should be performed on the role pattern "data administrator" with the role "sales promotion_administrator".

FIG. 11 is an explanatory diagram illustrating an example of storage content of the access control table 1100. In FIG. 11, the access control table 1100 has fields of a table, a policy label, a role pattern, a role, writing, raw data reading, masking, and file encryption. By setting information in each field, access control information 1100-1 to 1100-5 is stored as records.

Here, the table indicates a name of a table (target table) in the database 220. The policy label indicates a data type stored in the table. The role pattern represents a role of a role in the table. The role indicates a role in the table. The writing, the raw data reading, and the masking represent content of access control that should be performed on each role pattern.

The access control information 1100-1 indicates content of access control that should be performed on the role corresponding to each role pattern, for the table "questionnaire information_EU" to which the policy label "EU resident_personal information" is assigned. However, the file encryption "o, x" indicates whether or not data encryption is required in the database 220.

(Example of Creating Access Control Execution Information)

Next, an example of creating the access control execution information will be described with reference to FIGS. 12 and 13.

Figure 12:
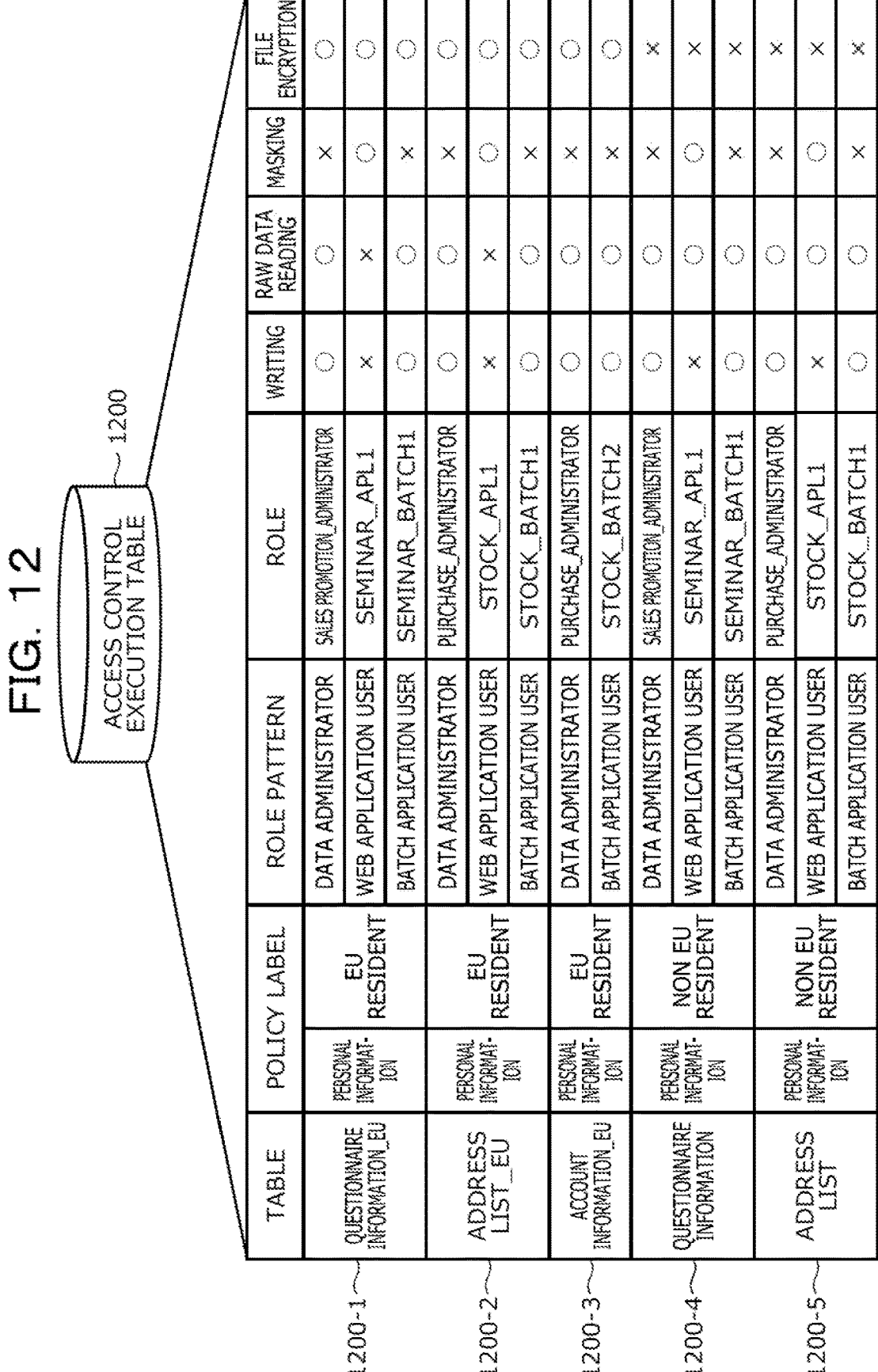
FIG. 12 is an explanatory diagram illustrating an example of storage content of an access control execution table 1200.

FIG. 12 is an explanatory diagram illustrating an example of storage content of the access control execution table 1200. FIG. 13 is an explanatory diagram illustrating an example of storage content of the access control execution table 1200 (updated). In FIGS. 12 and 13, the access control execution table 1200 has fields of a table, a policy label, a role pattern, a role, writing, raw data reading, masking, and file encryption. By setting information in each field, access control execution information 1200-1 to 1200-5 is stored as records.

For example, the access control assistance function 700 copies the access control table 1100 illustrated in FIG. 11 so as to create the access control execution table 1200 illustrated in FIG. 12. Then, the access control assistance function 700 refers to the system table (not illustrated), confirms a current access control status, and updates the access control execution table 1200 according to the confirmed result.

Here, regarding a table "account information_EU" to which the policy label "EU resident_personal information" is assigned, it is assumed that access control of writing "x" be performed on a role "stock_batch2" corresponding to the role pattern "batch application user". In this case, the access control assistance function 700 changes the writing about the role "stock_batch2" of access control execution information 1200-3 in the access control execution table 1200 to "x".

As a result, the access control assistance function 700 can create the access control execution information 1200-1 to 1200-5 representing the content of the access control performed on the role in each table in the database 220.

(Example of Detecting Difference Portion)

Next, an example of detecting the difference portion with respect to the access control information in the access control execution information will be described, with reference to FIGS. 14 and 15.

FIG. 14 is an explanatory diagram (part 1) illustrating a specific example of the difference detection result. In FIG. 14, a difference detection result 1400 includes diff results 1401 to 1405. The diff results 1401 to 1405 indicate presence or absence of a difference between content of access control that should be performed on a role, for the role in each table in the database 220 and content of access control that is performed on the role.

In FIGS. 14 and 15, "none" indicates that there is no difference in the content of the access control. "Yes" indicates that there is a difference in the content of the access control. Furthermore, an audit result "OK" indicates that there is no difference in all content of the access control. An audit result "not OK" indicates that at least any one of the contents of the access control has a difference.

For example, according to the diff result 1403, it is possible to specify that there is a difference in the access control regarding the writing to the role "stock_batch2", in the table "account information_EU" to which the policy label "EU resident_personal information" is assigned.

In this case, for example, when receiving a login request from the role "stock_batch2" to the database 220, the access control assistance function 700 may reject login of the role "stock_batch2", with reference to the diff result 1403. As a result, the access control assistance function 700 can reject an operation of the role "stock_batch2" that violates the security policy.

FIG. 15 is an explanatory diagram (part 2) illustrating a specific example of the difference detection result. In FIG. 15, a difference detection result 1500 includes diff results 1501 to 1505. For example, according to the diff result 1501, it is possible to specify that there is a difference in the access control regarding the writing to the role "seminar_APL1", in the table "questionnaire information_EU" to which the policy label "EU resident_personal information" is assigned.

In this case, for example, the access control assistance function 700 may refer to the access control information 1100-1 (refer to FIG. 11) of the role "seminar_APL1" and correct the content of the access control performed on the role "seminar_APL1". For example, the access control assistance function 700 changes setting of the database 220 so as not to permit writing to the role "seminar_APL1" in the table "questionnaire information_EU" to which the policy label "EU resident_personal information" is assigned.

As a result, the access control assistance function 700 can automatically correct the access control of the portion violating the security policy, to a correct authority.

(Various Processing Procedures of Database Management Device 201)

Next, various processing procedures of the database management device 201 will be described. First, an access control assistance processing procedure of the database management device 201 will be described, with reference to FIG. 16. Access control assistance processing of the database management device 201 is executed, for example, at the time when a new table is created.

Figure 16:
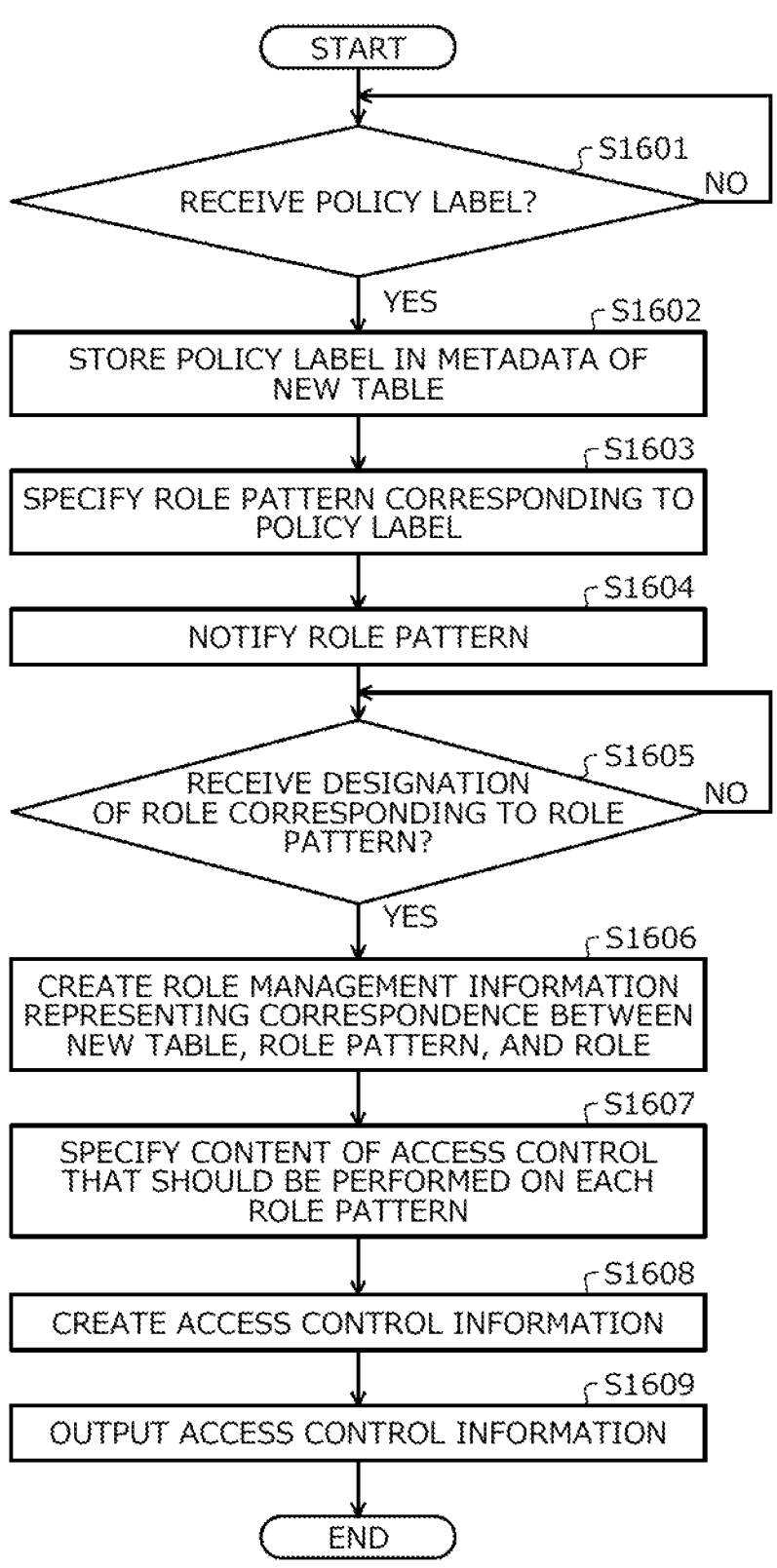
FIG. 16 is a flowchart illustrating an example of an access control assistance processing procedure of the database management device 201.

FIG. 16 is a flowchart illustrating an example of the access control assistance processing procedure of the database management device 201. In the flowchart in FIG. 16, first, the database management device 201 determines whether or not a policy label according to a data type to be stored in the new table is received (step S1601). The new table is a target table to be an access control target in the database 220.

Here, the database management device 201 waits for reception of the policy label (step S1601: No). Then, in a case of receiving the policy label (step S1601: Yes), the database management device 201 stores the received policy label in metadata of the new table (step S1602).

Next, the database management device 201 refers to the policy management table 230 and specifies a role pattern corresponding to the policy label stored in the metadata of the new table (step S1603). Then, the database management device 201 notifies the database administrator P1 of the specified role pattern regarding the new table (step S1604).

Next, the database management device 201 determines whether or not designation of one or more roles corresponding to each notified role pattern is received (step S1605). Here, the database management device 201 waits for reception of the designation of the role (step S1605: No).

In a case of receiving the designation of the role (step S1605: Yes), the database management device 201 creates role management information representing a correspondence between the new table, the role pattern, and the role (step S1606). The created role management information is registered, for example, in the role management table 240.

Then, the database management device 201 refers to the policy management table 230 and specifies content of access control that should be performed on each role pattern corresponding to the policy label stored in the metadata of the new table (step S1607). Next, the database management device 201 refers to the role management table 240 and creates access control information, based on the specified content of the access control that should be performed on each role pattern (step S1608).

The created access control information represents content of access control that should be performed on the role, for each role in the new table. The created access control information is registered, for example, in the policy management table 230.

Then, the database management device 201 outputs the created access control information to the database administrator P1 (step S1609) and ends the series of processes according to this flowchart.

As a result, the database management device 201 can easily specify the content of the access control that should be performed on each role in the new table, at the time when the new table is created or the like.

Next, an access control state monitoring processing procedure of the database management device 201 will be described with reference to FIG. 17. Access control state monitoring processing of the database management device 201 is executed periodically, for example, every certain period (one week, one month, or the like).

Figure 17:
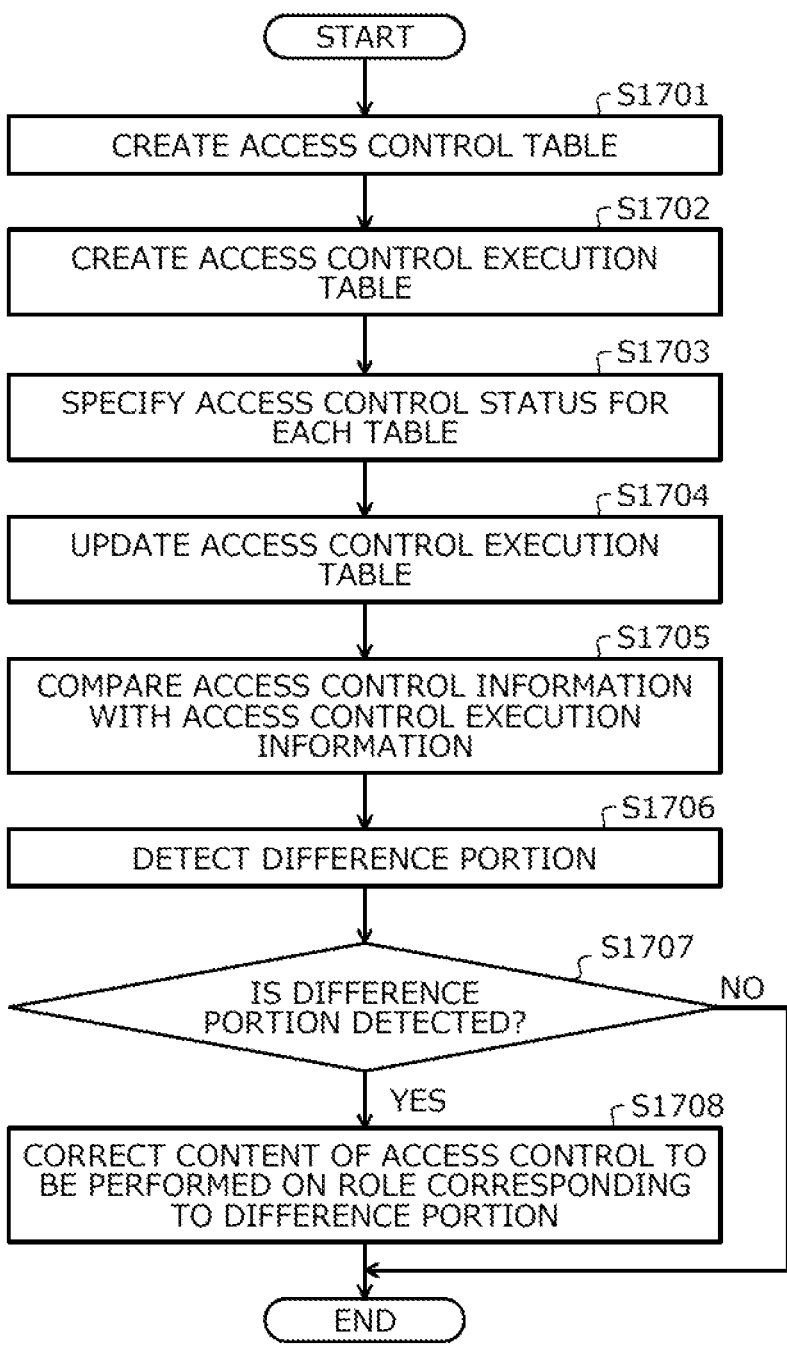
FIG. 17 is a flowchart illustrating an example of an access control state monitoring processing procedure of the database management device 201.

FIG. 17 is a flowchart illustrating an example of the access control state monitoring processing procedure of the database management device 201. In the flowchart in FIG. 17, first, the database management device 201 creates the access control table 1100 (step S1701).

For example, the database management device 201 refers to the policy management table 230 for each table (target table) in the database 220 and specifies the content of the access control that should be performed on each role pattern corresponding to the policy label stored in the metadata of each table. Then, the database management device 201 refers to the role management table 240 for each table in the database 220 and creates access control information based on the specified content of the access control that should be performed on each role pattern. As a result, the database management device 201 creates the access control table 1100 in which the access control information for each table in the database 220 is registered.

Next, the database management device 201 copies the created access control table 1100 so as to create the access control execution table 1200 (step S1702). Then, the database management device 201 refers to the system table (not illustrated) for each table in the database 220 and specifies a current access control status (step S1703).

Next, the database management device 201 updates the created access control execution table 1200, according to the specified access control status (step S1704). Then, the database management device 201 compares the access control information in the access control table 1100 with the access control execution information in the access control execution table 1200 (step S1705).

Next, the database management device 201 detects a difference portion of the access control execution information with respect to the access control information, based on the compared comparison result (step S1706). Then, the database management device 201 determines whether or not the difference portion is detected (step S1707).

Here, in a case where the difference portion is not detected (step S1707: No), the database management device 201 ends the series of processes according to this flowchart.

On the other hand, in a case where the difference portion is detected (step S1707: Yes), the database management device 201 refers to the access control information corresponding to the difference portion, corrects content of access control to be performed on a role corresponding to the difference portion (step S1708), and ends the series of processes according to this flowchart.

As a result, the database management device 201 periodically confirms the access control status of the database 220 and can automatically correct the access control of the portion violating the security policy to a correct authority.

Note that, in the example in FIG. 17, a case has been described where the content of the access control performed on the role corresponding to the difference portion is automatically corrected. However, the embodiment is not limited to this. For example, the database management device 201 may output a difference detection result from which the detected difference portion can be specified, to the security auditor P2 in step S1708.

As a result, the database management device 201 can provide information from which a portion where appropriate access control is not performed can be specified, to the security auditor P2. The difference detection result includes, for example, information from which the content of the access control that should be performed on the role corresponding to the difference portion and the content of the access control that is currently performed can be specified.

Next, a login permission determination processing procedure of the database management device 201 will be described with reference to FIG. 18.

Figure 18:
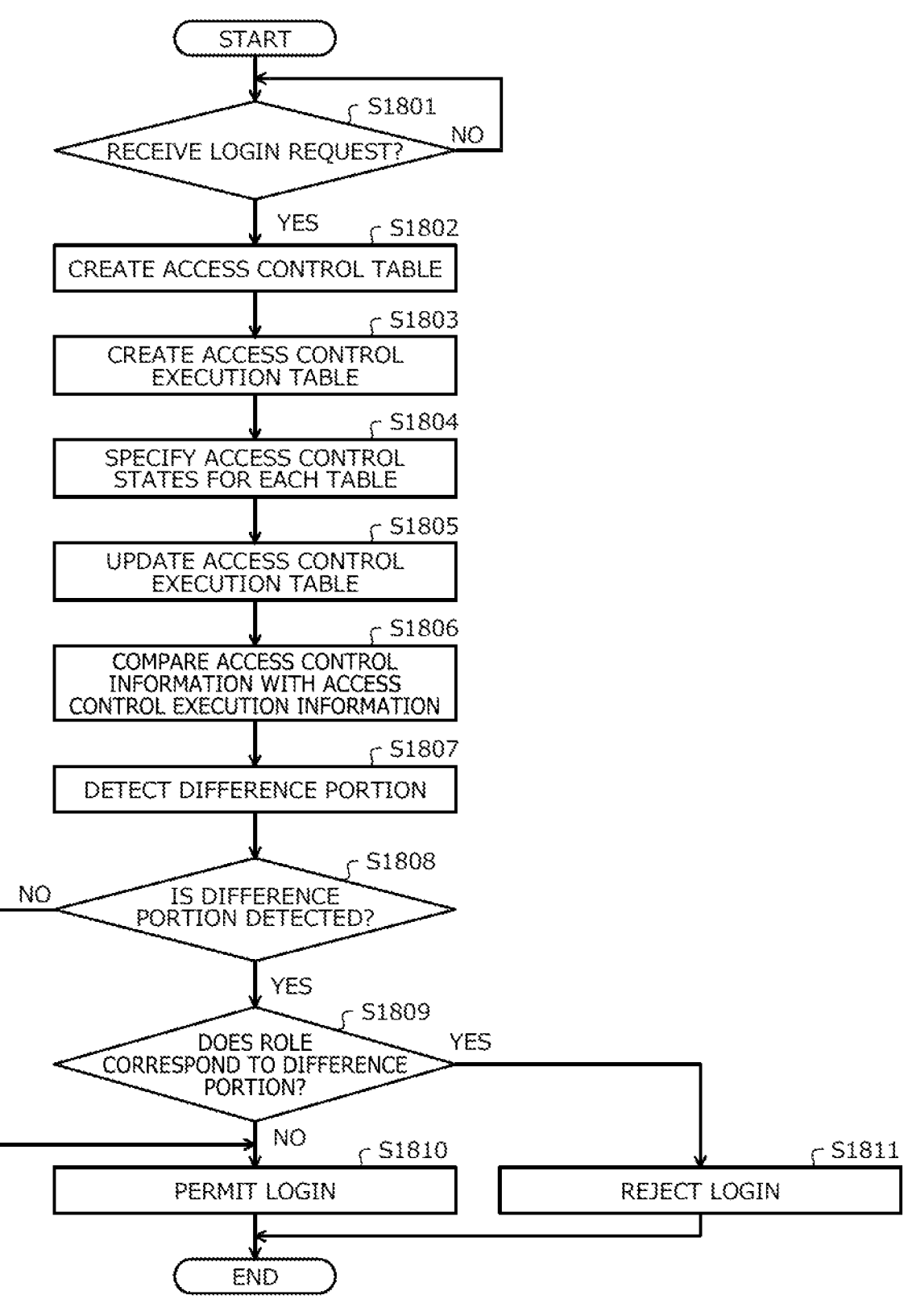
FIG. 18 is a flowchart illustrating an example of a login permission determination processing procedure of the database management device 201.

FIG. 18 is a flowchart illustrating an example of the login permission determination processing procedure of the database management device 201. In the flowchart in FIG. 18, first, it is determined whether or not a login request to the database 220 is received (step S1801).

Here, the database management device 201 waits for reception of the login request (step S1801: No). In a case of receiving the login request (step S1801: Yes), the database management device 201 creates the access control table 1100 (step S1802).

Next, the database management device 201 copies the created access control table 1100 so as to create the access control execution table 1200 (step S1803). Then, the database management device 201 refers to the system table (not illustrated) for each table in the database 220 and specifies a current access control status (step S1804).

Next, the database management device 201 updates the created access control execution table 1200, according to the specified access control status (step S1805). Then, the database management device 201 compares the access control information in the access control table 1100 with the access control execution information in the access control execution table 1200 (step S1806).

Next, the database management device 201 detects a difference portion of the access control execution information with respect to the access control information, based on the compared comparison result (step S1807). Then, the database management device 201 determines whether or not the difference portion is detected (step S1808).

Here, in a case where the difference portion is not detected (step S1808: No), the database management device 201 proceeds to step S1810. On the other hand, in a case where the difference portion is detected (step S1808: Yes), the database management device 201 determines whether or not the role that has received the login request is a role corresponding to the difference portion (step S1809).

Here, in a case where the role does not correspond to the difference portion (step S1809: No) the database management device 201 permits the login of the role that has received the login request (step S1810) and ends the series of processes according to this flowchart.

On the other hand, in a case where the role corresponds to the difference portion (step S1809: Yes), the database management device 201 rejects the login of the role that has received the login request (step S1811), and ends the series of processes according to this flowchart.

As a result, the database management device 201 can reject the login of the role that violates the security policy, to the database 220.

As described above, according to the database management device 201 according to the embodiment, it is possible to store the first policy label according to the data type to be stored in the target table to be the access control target in the database 220, in the metadata of the target table. Furthermore, according to the database management device 201, it is possible to refer to the policy management information and specify the content of the access control that should be performed on each role pattern corresponding to the first policy label stored in the metadata. The policy management information is the information defining the content of the access control that should be performed on each role pattern, for each policy label representing the data type (for example, refer to FIG. 4). Then, according to the database management device 201, it is possible to refer to the role management information, create the access control information based on the specified content of the access control that should be performed on each role pattern, and output the created access control information. The role management information is the information representing the correspondence between each role pattern and one or more roles in the target table (for example, refer to FIG. 5). The access control information is the information representing the content of the access control that should be performed on the role, for each role in the target table (for example, refer to FIG. 11).

As a result, the database management device 201 can easily specify the content of the access control for each role according to the security protocol, for the target table (for example, new table) in the database 220. Therefore, the database management device 201 can reduce the trouble of designing the appropriate access control according to the security protocol and reduce a workload of the database administrator P1 on the implementation of the access control. For example, the database administrator P1 can collectively set the access authorities regarding the respective roles in the target table.

Furthermore, according to the database management device 201, it is possible to refer to the access control status with respect to the target table in the database 220 and create the access control execution information. The access control execution information is the information representing the content of the access control performed on the role, for each role in the target table. Then, according to the database management device 201, it is possible to detect the difference portion of the access control execution information with respect to the access control information, based on the comparison result obtained by comparing the access control information with the access control execution information.

As a result, the database management device 201 can detect a portion that violates the security policy.

Furthermore, according to the database management device 201, it is possible to output the difference detection result from which the detected difference portion can be specified.

As a result, the database management device 201 can easily specify the portion that violates the security policy and reduce the load applied when the security auditor P2 monitors the access control status.

Furthermore, according to the database management device 201, when receiving the login request from the first role with respect to the database 220, it is possible to determine whether or not the first role is the role corresponding to the detected difference portion. Then, according to the database management device 201, in a case where the first role is the role corresponding to the difference portion, it is possible to reject the login of the first role. Furthermore, according to the database management device 201, in a case where the first role is not the role corresponding to the difference portion, it is possible to permit the login of the first role.

As a result, the database management device 201 can ensure security by preventing an operation of a role that has an unauthorized access authority, to the database 220.

Furthermore, according to the database management device 201, when the login request is received, it is possible to refer to the access control status with respect to the target table in the database 220 and create the access control execution information. Then, according to the database management device 201, it is possible to detect the difference portion of the access control execution information with respect to the access control information, based on the comparison result obtained by comparing the access control information with the access control execution information and determine whether or not the first role is the role corresponding to the detected difference portion.

As a result, the database management device 201 can confirm the latest access control status and detect a portion that violates the security policy.

Furthermore, according to the database management device 201, it is possible to refer to the access control information and correct the content of the access control performed on the role corresponding to the difference portion in the target table.

As a result, the database management device 201 can automatically correct the access control of the portion that violates the security policy, to the correct authority.

Furthermore, according to the database management device 201, it is possible to refer to the policy management information, specify each role pattern corresponding to the first policy label, and receive the designation of the one or more roles corresponding to each specified role pattern, in the target table. For example, the database management device 201 receives the designation of the one or more roles corresponding to each role pattern from the database administrator P1, by notifying the database administrator P1 of each specified role pattern, for the new table (target table). Then, according to the database management device 201, it is possible to create the role management information in which each role pattern in the target table is associated with the one or more designated roles.

As a result, the database management device 201 can create the role management information representing the correspondence between each role pattern in the new table and the one or more roles, at the time when the new table is created or the like. For example, since it is sufficient to designate a role corresponding to the notified role pattern, the database administrator P1 can reduce the load of creating the role management information.

For these reasons, according to the database management device 201, it is possible to reduce the load of the database system management that requires the access control conforming to the standard rule of the security certification. As a result, for example, the database management device 201 can reduce the load of acquiring the security certification that needs periodical update, and suppress running cost for security audit.

Furthermore, the database management device 201 can manage the information (policy label) of the data type, not as column data of the target table, as the metadata of the target data. For example, the database administrator P1 does not need to view all the tables each time when the security protocol is rewritten. For example, it is assumed that raw data reading by people other than an administrator be prohibited, for the personal information corresponding to "EU_resident", due to the change of the security protocol. In this case, when information regarding the data type is added as the column data, the database administrator P1 refers to policy label columns of all the tables and changes access restriction of a table where a label to be changed exists.

On the other hand, the information regarding the data type is managed as the metadata, the database administrator P1 can refer to the policy label of the metadata and change the access restriction of the table, without confirming content of the table. For example, in a case where the security protocol is changed, the database administrator P1 can audit whether or not access control conforming to the changed security protocol is performed, in monitoring of the access control status, by updating the policy management information.

Furthermore, the database management device 201 can prevent change of table design and an increase in a table size, and prevent performance deterioration caused by the information management of the data type. Furthermore, since the table design is not changed, the database management device 201 can reduce a work for correcting a business application side in order to acquire the security certification.

Note that the database management method described in the present embodiment may be implemented by executing a program prepared in advance by a computer such as a personal computer or a workstation. The present database management program is recorded on a computer-readable recording medium such as a hard disk, a flexible disk, a CD-ROM, a DVD, or a USB memory, and is read from the recording medium to be executed by a computer. Furthermore, the present database management program may be distributed via a network such as the Internet.

Furthermore, the information processing device 101 (database management device 201) described in the present embodiment may be implemented by a special-purpose integrated circuit (IC) such as a standard cell or a structured application specific integrated circuit (ASIC) or a programmable logic device (PLD) such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a database management program for causing a computer to execute processing comprising:
   (1) in response to creating a target table that is an access control target in a database, storing, in metadata of the target table, a first policy label associated with a first data type to be stored in the target table; and
   (2) in response to the storing of the first policy label in the metadata of the target table:
      (2-1) referring to a policy management database configured to store, for each policy label of a plurality of policy labels each associated with a respective data type, policy management information that indicates, for each role pattern of a plurality of role patterns, content of access control that is to be performed on the each role pattern;
      (2-2) specifying, from the policy management database, the policy management information corresponding to the first policy label stored in the metadata of the target table;
      (2-3) referring to a role management database configured to store, for each table of a plurality of tables including the target table in the database, role management information that indicates a correspondence between the each role pattern and one or more specific roles in the each table;
      (2-4) specifying, from the role management database, the role management information corresponding to the target table; and
      (2-5) creating, based on the specified policy management information and the specified role management information, access control information that indicates, for each specific role identified in the specified role management information, as content of access control that is to be performed on the each specific role, the content of access control defined for the role pattern corresponding to the each specific role, as indicated in the specified policy management information,
   wherein the role patterns include at least one of a data administrator, a web application user, and a batch application user.

2. The non-transitory computer-readable recording medium according to claim 1, for causing the computer to execute processing further comprising:
   outputting the created access control information.

3. The non-transitory computer-readable recording medium according to claim 1, for causing the computer to execute processing further comprising:
   referring to an access control status with respect to the target table in the database and creating access control execution information that represents content of access control performed on a role for the each role in the target table; and
   detecting a difference portion of the access control execution information with respect to the access control information based on a comparison result of comparing the access control information with the access control execution information.

4. The non-transitory computer-readable recording medium according to claim 3, for causing the computer to execute processing further comprising:
   outputting information from which the detected difference portion is capable of being specified.

5. The non-transitory computer-readable recording medium according to claim 3, for causing the computer to execute processing further comprising:
   when receiving a login request from a first role with respect to the database, determining whether or not the first role is a role that corresponds to the difference portion;

in a case where the first role is the role that corresponds to the difference portion, rejecting login of the first role; and in a case where the first role is not the role that corresponds to the difference portion, permitting the login of the first role.

6. The non-transitory computer-readable recording medium according to claim 5, wherein when the login request is received, an access control status with respect to the target table in the database is referred, and the access control execution information is created, the difference portion is detected based on a comparison result of comparing the access control information with the access control execution information, and determining whether or not the first role is a role that corresponds to the detected difference portion.

7. The non-transitory computer-readable recording medium according to claim 3, for causing the computer to execute processing further comprising:

referring to the access control information and correcting content of access control to be performed on a role that corresponds to the difference portion in the target table.

8. The non-transitory computer-readable recording medium according to claim 1, for causing the computer to execute processing further comprising:

referring to the policy management information and specifying the each role pattern that corresponds to the first policy label;

receiving designation of one or more roles that correspond to the each specified role pattern, in the target table; and creating the role management information in which the each role pattern in the target table is associated with the one or more designated roles.

9. A database management method executed on a computer including a memory, the method comprising:

(1) in response to creating a target table that is an access control target in a database, storing, in metadata of the target table, a first policy label associated with a first data type to be stored in the target table; and (2) in response to the storing of the first policy label in the metadata of the target table:

(2-1) referring to a policy management database configured to store, for each policy label of a plurality of policy labels each associated with a respective data type, policy management information that indicates, for each role pattern of a plurality of role patterns, content of access control that is to be performed on the each role pattern;

(2-2) specifying, from the policy management database, the policy management information corresponding to the first policy label stored in the metadata of the target table;

(2-3) referring to a role management database configured to store, for each table of a plurality of tables including the target table in the database, role management information that indicates a correspondence between the each role pattern and one or more specific roles in the each table;

(2-4) specifying, from the role management database, the role management information corresponding to the target table; and (2-5) creating, based on the specified policy management information and the specified role management information, access control information that indicates, for each specific role identified in the specified role management information, as content of access control that is to be performed on the each specific role, the content of access control defined for the role pattern corresponding to the each specific role, as indicated in the specified policy management information, wherein the role patterns include at least one of a data administrator, a web application user, and a batch application user.

10. An information processing device comprising:

a memory; and a processor coupled to the memory and configured to:

(1) in response to creating a target table that is an access control target in a database, store, in metadata of the target table, a first policy label associated with a first data type to be stored in the target table; and (2) in response to the storing of the first policy label in the metadata of the target table:

(2-1) refer to a policy management database configured to store, for each policy label of a plurality of policy labels each associated with a respective data type, policy management information that indicates, for each role pattern of a plurality of role patterns, content of access control that is to be performed on the each role pattern;

(2-2) specify, from the policy management database, the policy management information corresponding to the first policy label stored in the metadata of the target table;

(2-3) refer to a role management database configured to store, for each table of a plurality of tables including the target table in the database, role management information that indicates a correspondence between the each role pattern and one or more specific roles in the each target table; and (2-4) specify, from the role management database, the role management information corresponding to the target table; and (2-5) creating, based on the specified policy management information and the specified role management information, access control information that indicates, for each specific role identified in the specified role management information, as content of access control that is to be performed on the each specific role, the content of access control defined for the role pattern corresponding to the each specific role, as indicated in the specified policy management information, wherein the role patterns include at least one of a data administrator, a web application user, and a batch application user.

* * * * *